US012440448B2

(12) United States Patent
Taguchi

(10) Patent No.: US 12,440,448 B2
(45) Date of Patent: Oct. 14, 2025

(54) POWDER, WOUND-COVERING MATERIAL, ADHESION PREVENTION MATERIAL, HEMOSTATIC MATERIAL, AND PRODUCTION METHOD FOR POWDER

(71) Applicant: NATIONAL INSTITUTE FOR MATERIALS SCIENCE, Tsukuba (JP)

(72) Inventor: Tetsushi Taguchi, Tsukuba (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 755 days.

(21) Appl. No.: 17/414,510

(22) PCT Filed: Dec. 20, 2019

(86) PCT No.: PCT/JP2019/050157
§ 371 (c)(1),
(2) Date: Jun. 16, 2021

(87) PCT Pub. No.: WO2020/137903
PCT Pub. Date: Jul. 2, 2020

(65) Prior Publication Data
US 2022/0062179 A1    Mar. 3, 2022

(30) Foreign Application Priority Data
Dec. 26, 2018   (JP) ................. 2018-243101

(51) Int. Cl.
*A61K 9/16*     (2006.01)
*A61K 9/19*     (2006.01)
*A61L 26/00*    (2006.01)

(52) U.S. Cl.
CPC .......... *A61K 9/1658* (2013.01); *A61K 9/1682* (2013.01); *A61K 9/19* (2013.01); *A61L 26/0038* (2013.01); *A61L 2400/04* (2013.01)

(58) Field of Classification Search
None
See application file for complete search history.

(56) References Cited

U.S. PATENT DOCUMENTS

| 2007/0020314 | A1  | 1/2007  | Haro et al. |
| 2008/0132682 | A1  | 6/2008  | Kanayama et al. |
| 2009/0099268 | A1  | 4/2009  | Otani et al. |
| 2009/0175946 | A1* | 7/2009  | Gaissmaier ............. A61P 41/00 424/94.1 |
| 2019/0336642 | A1  | 11/2019 | Taguchi |
| 2020/0206382 | A1* | 7/2020  | Taguchi ............. A61L 24/0026 |

FOREIGN PATENT DOCUMENTS

| CN | 101232907 A  | 7/2008 |
| CN | 108472405 A  | 8/2018 |
| EP | 3 406 270 A1 | 11/2018 |
| JP | 2007-231225 A | 9/2007 |
| JP | 2010-083788 A | 4/2010 |
| JP | 2014-058465 A | 4/2014 |
| JP | 2015-231564 A | 12/2015 |
| JP | 2019-051189 A | 4/2019 |
| WO | WO 2005/000374 A1 | 1/2005 |
| WO | WO 2017/126390 A1 | 7/2017 |
| WO | WO 2019/045081 A1 | 3/2019 |

OTHER PUBLICATIONS

Nishiguchi, Akihiro et al., "Development of multifunctional wound healing particles toward digestive system cancer therapy", Preprints of the Annual Meeting of the Jaganese Society for Biomaterials, Nov. 2018, vol. 40, p. 85.
Nishiguchi, A. et al., "Colloidal wound dressing with high tissue adhensiveness for digestive system cancer therapy.", Programme 29th Annual Congress of the Eurogean Society for Biomaterials., Nov. 2018, oral presentation No. 16.
Mizuno, Y. et al., "Enhanced sealing strength of a hydrophobically-modified Alaska pollock gelatin-based sealant", Biomater. Sci., 2017, vol. 5, No. 5, pp. 982-989.
Nishiguchi, A. et al., "Multifunctional hydrophobized microparticles for accelerated wound healing after endoscopic submucosal dissection", Small, Aug. 2019, vol. 15, No. 35, pp. e1901566(1-9).
Supplemental information of NishiguchiI, A. et al., "Multifunctional hydrophobized microparticles for accelerated wound healing after endoscopic submucosal dissection", Small, Aug. 2019, vol. 15, No. 35, pp. e1901566(1-9).
Akihiro Nishiguchi et al., "Underwater-adhesive microparticle dressing composed of hydrophobically-modified Alaska pollock gelatin for gastrointestinal tract wound healing", Acta Biomaterialis, accepted Aug. 26, 2019.
Three Supplemental information of Akihiro Nishiguchi et al., "Underwater-adhesive microparticle dressing composed of hydrophobically-modified Alaska pollock gelatin for gastrointestinal tract wound healing", Acta Biomaterialis, accepted Aug. 26, 2019.

(Continued)

*Primary Examiner* — Anna R Falkowitz
*Assistant Examiner* — Garen Gotfredson
(74) *Attorney, Agent, or Firm* — Crowell & Moring LLP

(57) ABSTRACT

The present invention addresses the problem of providing a powder that has excellent adhesive strength to biological tissue when applied to a wound-covering material or the like. The present invention also addresses the problem of providing a wound-covering material and an adhesion prevention material. The powder contains particles containing a crosslinked gelatin derivative, wherein the gelatin derivative has a structure represented by formula (1): GltnNH-L-CHR1R2 (in the formula, Gltn represents a residue of gelatin, L represents a single bond or a divalent linking group, $R^1$ represents a hydrocarbon group having 1-20 carbon atoms, and $R^2$ represents a hydrogen atom or a hydrocarbon group having 1-20 carbon atoms), the particles have an average sphericity of 1.45 or less, and the standard deviation of the sphericity of the particles is 0.25 or less.

17 Claims, 8 Drawing Sheets

(56) References Cited

OTHER PUBLICATIONS

International Search Report in Application No. PCT/JP2019/050157, dated Mar. 24, 2020, 3 pages.
Office Action in China Application No. 201980085478.X, including English translation, dated Feb. 29, 2024, 16 pages.
Supplementary European Search Report issued in European Application No. 19905004.8, dated Aug. 25, 2022 (8 pages).
First Examination Report issued in Japanese Application No. 2020-563210, dated Jun. 1, 2022 (English translation) (7 pages).
Second Examination Report issued in Japanese Application No. 2020-563210, dated Oct. 5, 2022 (English translation) (5 pages).
Decision of Rejection issued in Japanese Patent Application No. 2020-563210, dated Apr. 5, 2023 (English translation) (4 pages).
Second Examination Report issued in Chinese Patent Application No. 2019-080085478.X, dated Oct. 31, 2024 (English translation) (5 pages).
Third Examination Report issued in Chinese Patent Application No. 2019-80085478.X, dated May 31, 2025 (English translation) (5 pages).

\* cited by examiner

POWDER, WOUND-COVERING MATERIAL, ADHESION PREVENTION MATERIAL, HEMOSTATIC MATERIAL, AND PRODUCTION METHOD FOR POWDER

RELATED APPLICATIONS

This application is a 371 application of PCT/JP2019/050157 having an international filing date of Dec. 20, 2019, which claims priority to JP2018-243101 filed Dec. 26, 2018, the entire content of each of which is incorporated herein by reference.

TECHNICAL FIELD

The present invention relates to a powder suitable for a wound dressing material, an anti-adhesion material, a hemostatic material, and the like, and a method for producing the same.

BACKGROUND ART

Gelatin has had a variety of medical applications due to its biocompatibility and biodegradability. As such a material, Patent Document 1 describes "a crosslinked gelatin obtained by crosslinking a gelatin having a molecular weight of 30,000 to 300,000 and a reduced endotoxin content of less than 1 EU/mL per 1.0% protein without a use of an exogenous crosslinking agent, wherein the crosslinked gelatin has a crosslinking ratio which allows its dissolution time in saline to be 240 hours or less".

PRIOR ART DOCUMENT

Patent Document

Patent Document 1: JP 2010-83788 A

SUMMARY OF INVENTION

Technical Problem

An object of the present invention is to provide a powder having excellent adhesiveness to a biological tissue when applied to a wound dressing material or the like. Another object of the present invention is to provide a powder that adheres to a biological tissue of interest while having a reduced adhesion to other tissues thereafter when applied to a wound dressing material or the like. Yet another object of the present invention is to provide a method for producing such a powder. Furthermore, an object of the present invention is to provide a wound dressing material, an anti-adhesion material, and a hemostatic material.

Solution to Problem

The present inventors have conducted intensive researches to achieve the above-described objects, and as a result, have found that the objects can be achieved by the following.

[1] A powder comprising particles containing a crosslinked gelatin derivative, wherein the gelatin derivative has a structure represented by formula (1):

$$\text{GltnNH-L-CHR}^1\text{R}^2 \qquad (1)$$

wherein Gltn represents a gelatin residue; L represents a single bond or a divalent linking group; $R^1$ represents a hydrocarbon group having 1 to 20 carbon atoms; and $R^2$ represents a hydrogen atom or a hydrocarbon group having 1 to 20 carbon atoms, and wherein the particles have an average sphericity of 1.45 or less, and a standard deviation of sphericity of 0.25 or less.

[2] The powder according to [1], wherein the gelatin derivative has a structure represented by formula (2):

$$\text{GltnNH-CHR}^1\text{R}^2 \qquad (2)$$

wherein Gltn represents a gelatin residue; $R^1$ is an alkyl group having 1 to 17 carbon atoms; and $R^2$ is a hydrogen atom or an alkyl group having 1 to 17 carbon atoms.

[3] The powder according to [1] or [2], wherein the powder has a water contact angle of less than 70° at 5 seconds after water drops, or an adhesive strength to porcine inner gastric wall at 5 minutes after immersed in saline is at least two times less than that before the immersion as measured in accordance with ASTM F-2258-05.

[4] The powder according to any of [1] to [3], wherein the gelatin is an alkali-treated gelatin.

[5] The powder according to any of [1] to [4], wherein the gelatin is an endotoxin reduction-treated gelatin.

[6] The powder according to any of [1] to [5], wherein the gelatin is derived from a cold-water fish.

[7] The powder according to any of [1] to [6], wherein a cross-sectional area of a gel layer is 0.010 mm² or more as measured in accordance with the following test:

Gel layer cross-sectional area measurement test: a powder to be measured is sprayed onto a surface of an esophageal submucosal tissue at an amount of 100 mg per 2.5 cm×2.5 cm; the tissue is left to stand at 37° C. for 48 hours to form a gel on the surface of the tissue; the gel is fixed with neutral buffered formalin to obtain a fixed gel; the fixed gel is observed with a phase contrast microscope; and a cross-sectional area of the gel is calculated in square millimeters from the observed phase contrast microscope image; wherein the test is performed three times, and an arithmetic mean value of the three values is taken as the cross-sectional area of the gel layer.

[8] The powder according to any of [2] to [7], wherein a storage modulus (G') measured at 2 minutes and 30 minutes after the powder was mixed with pig blood supplemented with an anticoagulant is 200 or more.

[9] A wound dressing material comprising the powder according to any of [1] to [8].

[10] An anti-adhesion material comprising the powder according to any of [1] to [8].

[11] A topical hemostatic material comprising the powder according to [8].

[12] A method for producing a powder, comprising: dissolving a gelatin derivative having a structure represented by formula (1):

$$\text{GltnNH-L-CHR}^1\text{R}^2 \qquad (1)$$

wherein Gltn represents a gelatin residue; L represents a single bond or a divalent linking group; $R^1$ represents a hydrocarbon group having 1 to 20 carbon atoms; and $R^2$ represents a hydrogen atom or a hydrocarbon group having 1 to 20 carbon atoms, in a good solvent to obtain a gelatin solution containing the gelatin derivative and the good solvent; adding a poor solvent to the gelatin solution to deposit intermediate particles containing the gelatin derivative in the gelatin solution; lyophilizing the gelatin solution after the deposition to obtain an intermediate powder containing the intermediate particles; and crosslinking the gelatin derivative in the intermediate particles to obtain a powder comprising particles containing the crosslinked gelatin derivative.

[13] The method according to [12], wherein the gelatin derivative has a structure represented by formula (2):

$$\text{GltnNH-CHR}^1\text{R}^2 \qquad (2)$$

wherein Gltn represents a gelatin residue; $R^1$ is an alkyl group having 1 to 17 carbon atoms, and $R^2$ is a hydrogen atom or an alkyl group having 1 to 17 carbon atoms.

[14] The method according to or [13], wherein the gelatin derivative is crosslinked by heating the intermediate powder.

[15] The production method according to [14], wherein the gelatin derivative is crosslinked by heating the intermediate powder at 100 to 200° C. for 2.5 to 5 hours.

[16] The method according to any of to [15], further comprising irradiating the powder comprising the particles containing the crosslinked gelatin derivative with ultraviolet light to hydrophilize surfaces of the particles.

[17] The method according to [16], wherein the powder is irradiated with ultraviolet light for 3 to 6 hours.

Advantageous Effects of Invention

An embodiment of the present invention can provide a powder having an excellent adhesive strength to a biological tissue when applied as a wound dressing material or the like. Another embodiment of the present invention can provide a powder that, as applied as a wound dressing material or the like, adheres to a biological tissue of interest while having reduced adhesion to other tissues on the exposed surface thereafter. Yet another embodiment of the present invention can provide a wound dressing material and an anti-adhesion material having such characteristics.

DESCRIPTION OF EMBODIMENTS

Figure 1:
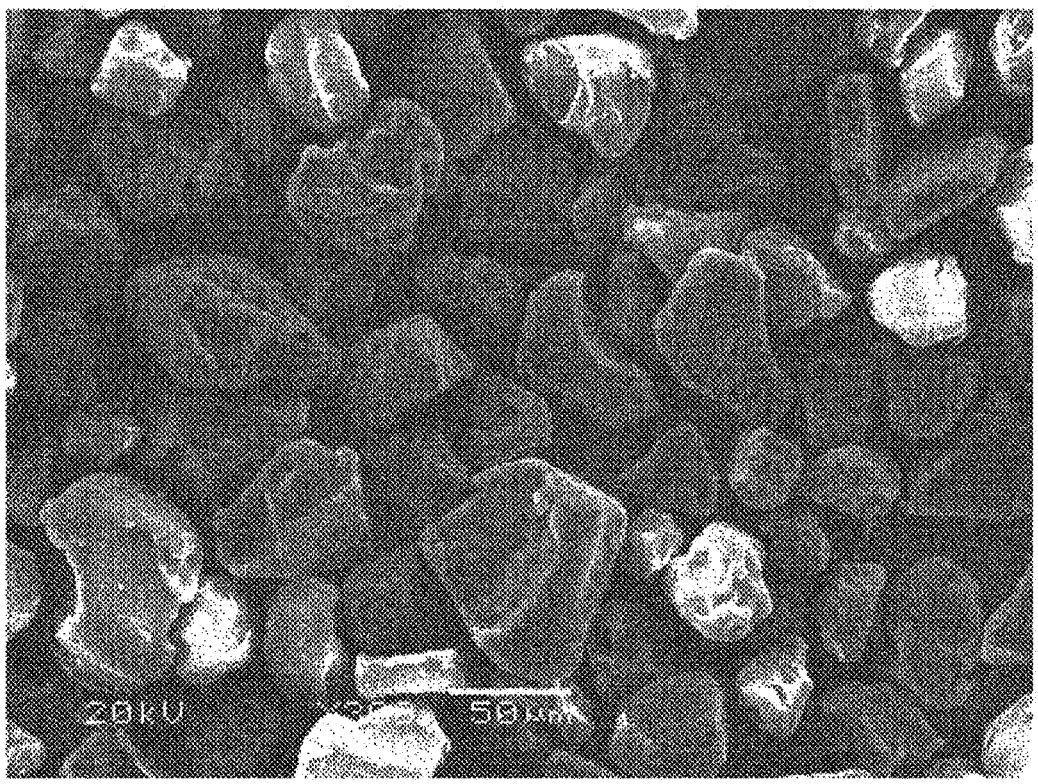
FIG. 1 is a scanning type electron microscope image of the powder prepared from 76.8C6 ApGltn (Mw: 31,000) by Method B.
Figure 2:
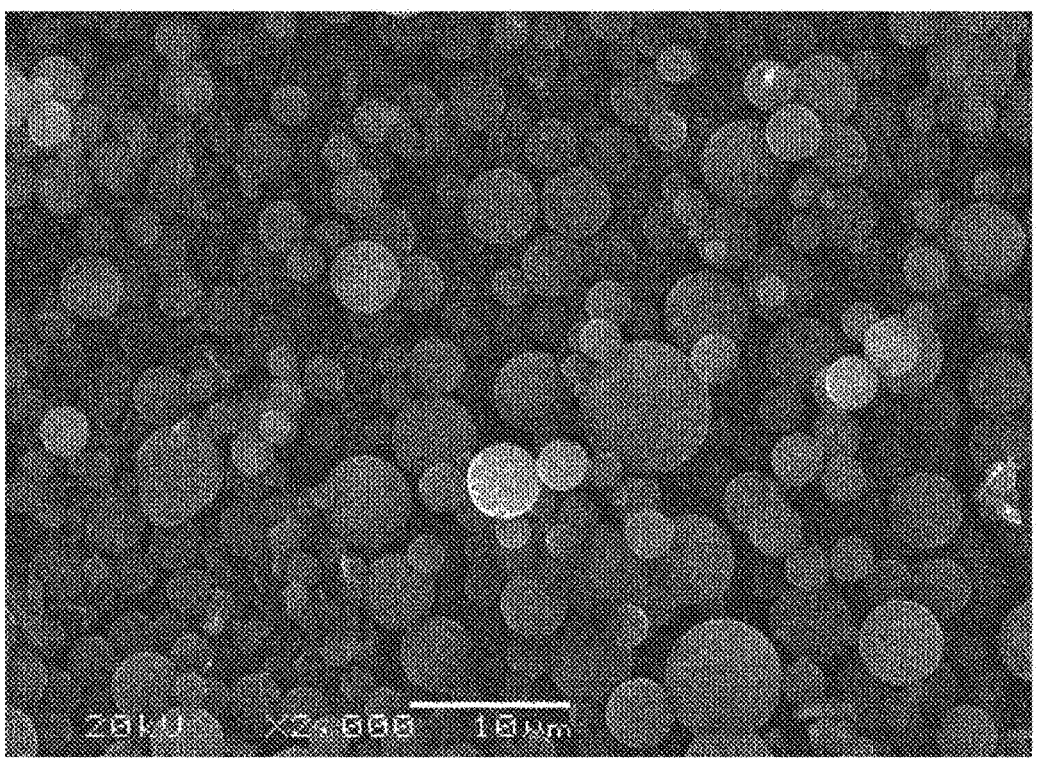
FIG. 2 is a scanning type electron microscope image of the powder prepared from 76.8C6 ApGltn (Mw: 31,000) by Method A-1.
Figure 3:
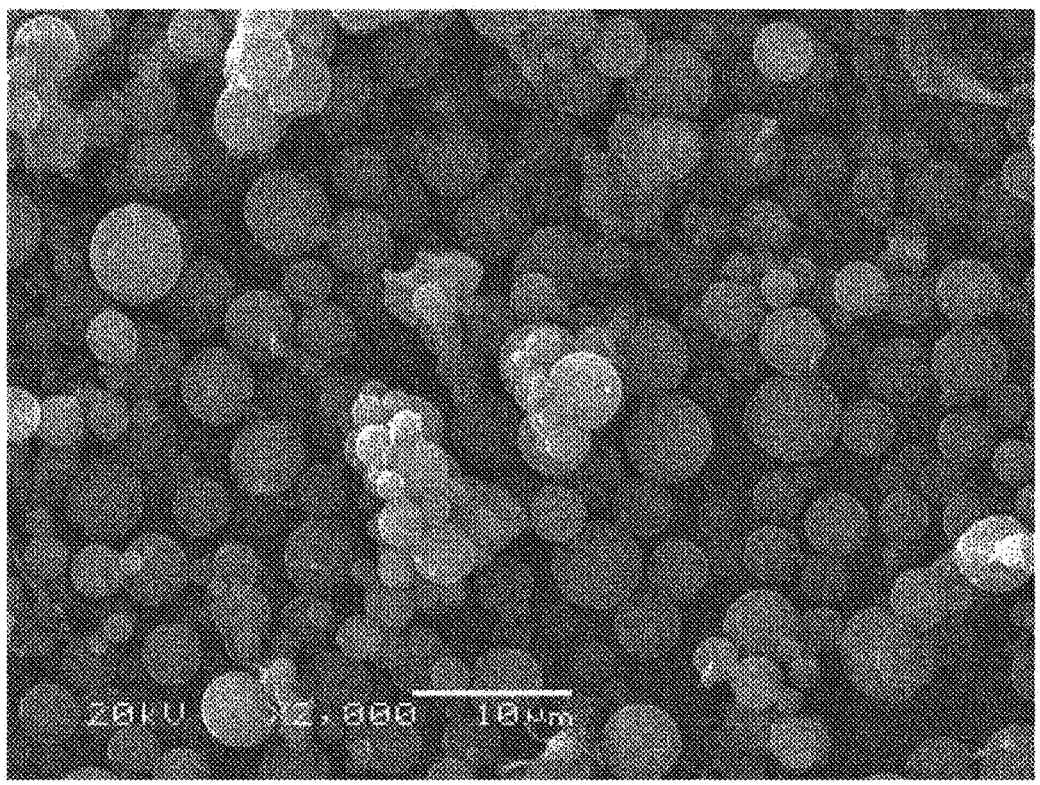
FIG. 3 is a scanning type electron microscope image of the powder prepared from Org ApGltn (Mw: 31,000) by Method A-1.
Figure 4:
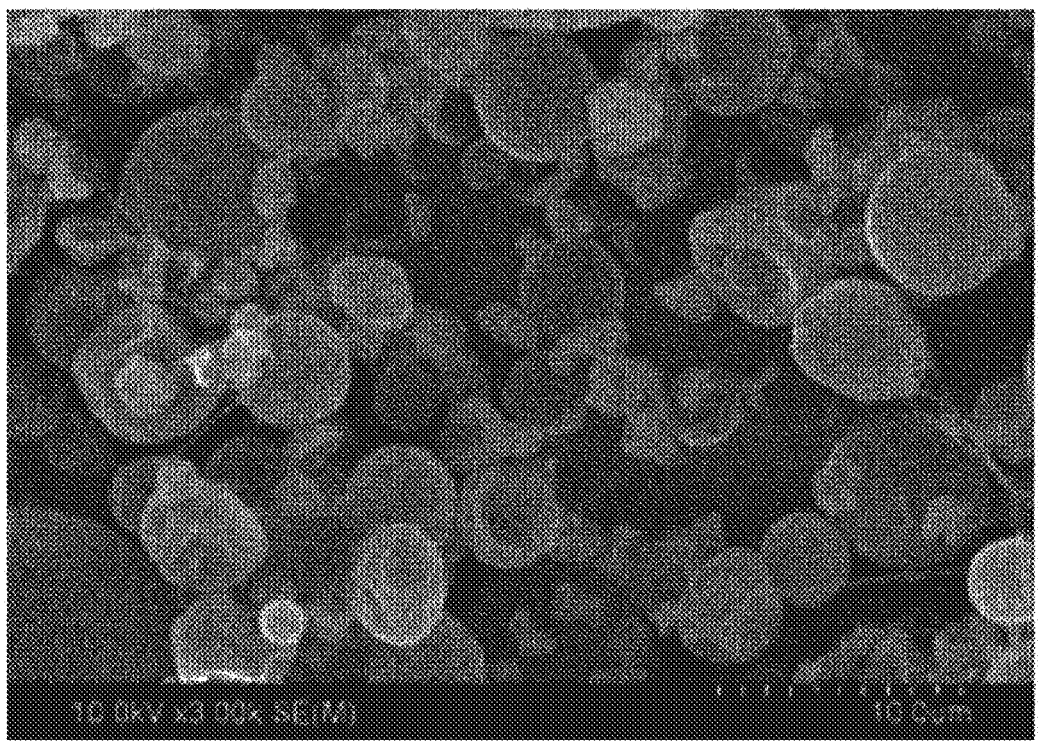
FIG. 4 is a scanning type electron microscope image of the powder prepared from 75C8 pig gelatin by Method C.

Hereinafter, the present invention is described in detail.

The following description is made based on exemplary embodiments of the present invention, but the present invention is not limited to such embodiments.

As used herein, the numerical range expressed with "to" means a range including the numerical values described before and after "to" as the lower limit value and the upper limit value.

[Powder]

A powder according to one embodiment of the present invention comprises particles containing a crosslinked gelatin derivative, wherein the gelatin derivative has a structure represented by formula (1):

GltnNH-L-CHR$^1$R$^2$  (1)

wherein Gltn represents a gelatin residue; L represents a single bond or a divalent linking group; R$^1$ represents a hydrocarbon group having 1 to 20 carbon atoms; and R$^2$ represents a hydrogen atom or a hydrocarbon group having 1 to 20 carbon atoms, and wherein the particles have an average sphericity of 1.45 or less, and a standard deviation of sphericity of 0.25 or less.

Without wishing to be bound by any theory, the present inventors presume a mechanism of action by which such a powder exerts an excellent adhesive strength to a biological tissue as follows. First of all, however, the following mechanism is based on a speculation, and even if the effect of the present invention is obtained by another mechanism, it does not have any effect on the scope of the present invention. As used herein, the "powder" means a group of particles (including an aggregate).

A powder according to this embodiment comprises particles containing a crosslinked gelatin derivative in which a hydrophobic group (described in detail later) has been introduced, as shown in formula (1) above. As the powder in a dry state is sprayed, therefore, the introduced hydrophobic groups are deemed to improve the penetration of the particles into a target tissue, resulting in excellent adhesiveness to the biological tissue. Such a characteristic can be also explained by the fact that in the Examples described below, the powder of Example 1, comprising particles of a crosslinked gelatin derivative into which a hydrophobic group was introduced, had an increased adhesive strength to a biological tissue by 2.4 times as compared to that of the powder of Example 3, comprising particles of a crosslinked gelatin derivative into which no hydrophobic group was introduced.

Furthermore, a powder according to this embodiment comprises particles having a high sphericity and less variation in shape. When the powder is applied to a biological tissue, therefore, the present powder is hexagonally close packed to the tissue surface, resulting in an excellent adhesive strength to the biological tissue.

This characteristic is also explained by the fact that in the Examples described below, the powder of Example 1, having a higher sphericity and a lower standard deviation of sphericity, had an increased adhesive strength to a biological tissue by 1.3 times or more as compared to that of the powder of Example 2, having a lower sphericity and a larger standard deviation of sphericity.

The powder according to this embodiment is deemed to achieve an excellent adhesive strength by a synergistic effect of the two characteristics described above. The present invention provides such a powder for the first time.

A powder according to another embodiment of the present invention comprises particles containing a crosslinked gelatin derivative, wherein the gelatin derivative has a structure represented by formula (1):

GltnNH-L-CHR$^1$R$^2$  (1)

wherein Gltn represents a gelatin residue; L represents a single bond or a divalent linking group; R$^1$ represents a hydrocarbon group having 1 to 20 carbon atoms; and R$^2$ represents a hydrogen atom or a hydrocarbon group having 1 to 20 carbon atoms, and wherein the powder has a water droplet contact angle of less than 70° at 5 seconds after water drops, or an adhesive strength of the powder to porcine inner gastric wall tissue at 5 minutes after immersed into saline is at least two times less than that before the immersion as measured in accordance with the standard of American Society for Testing and Materials (ASTM F-2258-05).

The powder according to this embodiment is also deemed to have excellent adhesiveness to a biological tissue due to particles containing a crosslinked gelatin derivative into which a hydrophobic group has been introduced. The powder according to this embodiment also has the characteristic, as described above, that the water droplet contact angle at 5 seconds after dropping water is less than 70°, or that an adhesive strength thereof to porcine inner gastric wall tissue at 5 minutes after immersed into saline is at least two times less than that before the immersion. These characteristics are understood to be provided by the hydrophilization of particle surfaces by ultraviolet light irradiation as demonstrated in the Examples described below. The powder according to this embodiment has still high adhesive strength to a tissue, but the adhesive strength of the exposed surface thereof rapidly decreases after the powder is applied to the tissue, and thus adhesion to other tissues is advantageously prevented. In a preferred aspect of this embodiment, a powder has excellent blood coagulation ability as demonstrated in the Examples described below, although the mechanism of this action is not entirely elucidated. The powder is expected to be applied by utilizing this characteristic.

Hereinafter, the components and others of powders according to representative embodiments of the present invention (hereinafter, sometimes referred to as the present powder) are described in detail.

<Gelatin Derivative>

The present powder comprises particles containing a crosslinked gelatin derivative. This gelatin derivative having a structure represented by formula (1).

GltnNH-L-CHR$^1$R$^2$  (1)

In the formula (1), Gltn represents a gelatin residue; L represents a single bond or a divalent linking group; R$^1$ represents a hydrocarbon group having 1 to 20 carbon atoms; and R$^2$ represents a hydrogen atom or a hydrocarbon group having 1 to 20 carbon atoms.

The divalent linking group of L includes, but are not particularly limited to, —C(O)—, —C(O)O—, —OC(O)—, —O—, —S—, —N(R)— (R represents a hydrogen atom or a monovalent organic group, preferably a hydrocarbon group having 1 to 20 carbon atoms), an alkylene group (preferably an alkylene group having 2 to 10 carbon atoms), an alkenylene group (preferably an alkenylene group having 2 to 10 carbon atoms), and combinations thereof. Among these, —C(O)— is preferred. Thus, L is preferably a single bond or —C(O)—.

*-L-CHR$^1$R$^2$ (* represents an attachment point) is preferably linked to an ε-amino group of an original gelatin, and more preferably to an ε-amino group of lysine (Lys) in the gelatin. Linking *-L-CHR$^1$R$^2$ to an amino group, preferably an amino group of lysine, via a linking group or without a linking group (in other words, directly) may be performed by methods of utilizing so-called reducing (or reductive) amination reaction (with an aldehyde or a ketone) or Schotten-Baumann reaction (with an acid chloride).

The —NH— structure in formula (1) can be detected, for example, by a band near 3300 cm$^{-1}$ in the Fourier transform infrared absorption (FT-IR) spectrum.

The hydrocarbon group having 1 to 20 carbon atoms includes, but are not particularly limited to, a linear hydrocarbon group having 1 to 20 carbon atoms, an alicyclic hydrocarbon group having 3 to 20 carbon atoms, an aromatic hydrocarbon group having 6 to 14 carbon atoms, and a combinational group thereof.

When $R^2$ is a hydrocarbon group having 1 to 20, $R^2$ may be the same as or different from $R^1$. The alkyl groups of $R^1$ and $R^2$ may be linear or branched.

The linear hydrocarbon group having 1 to 20 carbon atoms includes, but are not particularly limited to, a methyl group, an ethyl group, a propyl group, a butyl group, a hexyl group, an octyl group (or a capryl group), a nonyl group (or a pelargornyl group), a decyl group, a dodecyl group (or a lauryl group), and a tetradecyl group (or a myristyl group). Especially, in terms of obtaining a powder having more excellent adhesiveness, $R^1$ is preferably an alkyl group having 1 to 13 carbon atoms, more preferably an alkyl group having 7 to 12 carbon atoms, further preferably an alkyl group having 8 to 11 carbon atoms, and particularly preferably an alkyl group having 9 to 11 carbon atoms. $R^2$ is not particularly limited, but preferably a hydrogen atom.

The alicyclic hydrocarbon group having 3 to 20 carbon atoms includes, but are not particularly limited to, a cyclopropyl group, a cyclopentyl group, a cyclohexyl group, an adamantyl group, and a norbornyl group.

The aromatic hydrocarbon group having 6 to 14 carbon atoms includes, but are not particularly limited to, a phenyl group, a tolyl group, and a naphthyl group.

The combinational group thereof includes, but are not particularly limited to, an aralkyl group having 6 to 12 carbon atoms, such as a benzyl group, a phenethyl group, a naphthylmethyl group, and a naphthylethyl group.

A gelatin derivative represented by formula (1) is preferably at least one gelatin derivative selected from the group consisting of those represented by formulas (2) and (3):

GltnNH-CHR$^1$R$^2$      (2)

[Formula 1]

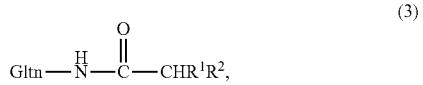

(3)

and more preferably a gelatin derivative represented by formula (2).

In formulas (2) and (3), the meaning of each symbol is the same as in formula (1), which has already been described, and preferable options are also the same as in formula (1).

As used herein, the "derivatization rate" is defined as the molar ratio of the content of the imino groups (*—NH-L-CHR$^1$R$^2$) in a gelatin derivative, to which an alkyl group is attached directly or via a linking group, relative to the content of the amino groups in the original gelatin.

The derivatization rate of the gelatin derivative is not particularly limited, but generally preferably 20 to 80 mol %, more preferably 30 to 70 mol %. In other words, the imino group/amino group (molar ratio) in the obtained gelatin derivative is preferably 20/80 to 80/20, more preferably 30/70 to 70/30.

As used herein, the derivatization rate is determined by quantifying the number of amino group in the original gelatin and the number of amino group in the gelatin derivative by 2,4,6-trinitrobenzene sulfonic acid method (TNBS method); and calculating a derivatization rate with the obtained values by the following formula:

Derivatization rate (mol %)=[number of amino groups in original gelatin−number of amino groups in gelatin derivative]/[number of amino groups in original gelatin]×100

Gelatin used as a raw material for the gelatin derivative (hereinafter, sometimes referred to as "original gelatin") may be any gelatins obtained from natural origin, obtained by synthesis (including fermentation, genetic recombination, or others), or obtained by subjecting a gelatin from natural origin or a synthesized gelatin to some processes.

The original gelatin specifically includes a naturally occurring gelatin obtained from skin, bone, tendon or the like of mammals, birds, fishes or the like; a processed gelatin obtained by subjecting a naturally occurring gelatin to an acid- or alkali-treatment, and, as appropriate, a thermal extract.

Among them, in terms of obtaining a powder having a more excellent effect of the present invention, an alkali-treated gelatin is preferred.

When the powder is administered to a living body, for example, as a wound dressing material or the like, endotoxin-reduced gelatin, which has a reduced endotoxin content, is preferably used. The endotoxin-reduced gelatin is not particularly limited, and a known one can be used, including gelatins described in JP 2007-231225 A, the contents of which are incorporated herein by reference.

A gelatin derived from mammals includes gelatins derived from a pig and a bovine. A gelatin derived from fish preferably includes, but are not particularly limited to, a gelatin derived from a cold-water fish (fish living in cold water) such as a salmon, a trout, a cod, a sea bream, a tilapia, and a tuna (hereinafter, sometimes referred to as a "cold-water fish-derived gelatin").

Cold-water fish-derived gelatin is a linear polymer of two or more amino acids having 190 or less imino acids, more specifically 80 or less hydroxyprolines and 110 or less prolines, per 1000 constituent amino acids. Cold-water fish gelatin is fluid at ordinary temperature which is believed to be due to the number of hydroxyproline being 80 or less or the number of proline being 110 or less. It is believed that satisfying either of the conditions allows a denaturation temperature to be approximately room temperature or lower, which leads to fluidity at ordinary temperature.

Sea bream gelatin contains 73 hydroxyprolines and 108 prolines, and has a denaturation temperature of 302.5 K. Tilapia gelatin contains 82 hydroxyprolines and 110 prolines, and has a denaturation temperature of 309 K. In contrast, pig gelatin contains 95 hydroxyprolines and 121 prolines, and has a denaturation temperature of 316 K.

It should be noted that cold-water fish gelatin is similar to gelatin derived from animals in the amino acid sequences, and is readily decomposed by enzymes, and has high biocompatibility.

The molecular weight of an original gelatin is not particularly limited, but the weight-average molecular weight (Mw) thereof is preferably 5,000 to 100,000, more preferably 10,000 to 50,000, further preferably 20,000 to 40,000. As used herein, the weight-average molecular weight is determined by gel permeation chromatography (GPC).

A powder according to an embodiment of the present invention comprises particles containing a crosslinked gelatin derivative.

As used herein, the term "crosslinked" does not mean a reversible physical crosslinked structure but means a crosslinked structure obtained by an irreversible crosslinking reaction. Thus, the "crosslinked gelatin derivative" is a gelatin derivative having an irreversible crosslinked structure obtained by a crosslinking reaction, which is generated by imparting energy to a gelatin derivative with heat, light, an energy ray, or the like, and/or by using a crosslinking agent. Typically, the irreversible crosslinked structure is generated through the reaction between functional groups on side chains of gelatin, such as —$NH_2$, —OH, —SH, and —COOH. As shown in the Examples described below, particles containing a crosslinked gelatin derivative has enhanced adhesive strengths and are thus more suitable for a wound dressing material or the like.

According to a preferred embodiment of the present invention, particles containing a crosslinked gelatin derivative have a hydrophilized surface. More specifically, they have a water droplet contact angle of less than 70°, preferably 50° or less at 5 seconds after water drops.

As used herein, the "water droplet contact angle" or the "water contact angle" means an angle obtained by calculating an angle of a water droplet with a particle surface by the tangent method when the water is dropped onto the particle surface. Specifically, the contact angle was determined by placing 20 mg of each powder to be flat on a 1.5 cm×1 cm double-sided tape, adding 1 μl of ion exchange water dropwise; photographing the shape of the water droplet from the side of the water droplet every 0.5 seconds from the time point of 1 second after dropping; and determining an contact angle by the tangential method from the shape of a water droplet on a photograph at the time when the shapes of water droplets have become steady.

The particles according to this embodiment tend to swell in an environment where moisture is present, and their adhesive strength to a porcine inner gastric wall tissue at 5 minutes after immersed in saline is at least two times, preferably at least three times, less than that before the immersion as measured in accordance with ASTM F-2258-05, the test procedure of which is described in Examples below. Such a characteristic is typically provided by UV irradiation, as described in Examples described below. Due to such characteristics, adhesive strength to the exposed surface rapidly decreases by the presence of moisture after the powder is applied to a biological tissue, whereby adhesion to other tissues can be prevented.

In a preferred embodiment of the present invention, the powder has excellent blood coagulation ability. More specifically, when the powder is mixed with pig blood supplemented with an anticoagulant such as Na citrate with vortex in a concentration of 10% by mass, and a storage modulus (G') of the mixture is measured after 2 minutes, the storage modulus is 30 Pa or more, preferably 200 Pa or more, more preferably 300 Pa or more, and further preferably 400 Pa or more. The powder having such a high storage modulus (G') can be used, for example, as a hemostatic material.

As used herein, the "storage modulus (G')" refers to a value obtained by measuring the above mixture with a rheometer (brand name: MCR30, manufactured by ANTON PAAR GMBH, Inc.) on its stage prewarmed to 37 degrees under conditions of 1 hertz, 1% strain for 5 minutes.

<Particles>

In embodiments of the present invention, the particles are not limited as long as the particles contain a crosslinked gelatin derivative, and the particles may contain other components as long as the effect of the present invention is obtained. The content of a crosslinked gelatin derivative in the particles is not particularly limited, but in terms of obtaining a powder having a more excellent effect of the present invention, the content of a crosslinked gelatin derivative is preferably 90% by mass or more, and more preferably 99% by mass or more, relative to the total mass of the particle.

Examples of other components that may be contained in the particles include, but are not particularly limited to, a non-crosslinked gelatin derivative, a solvent, a buffering agent, a colorant, a preservative, an excipient, and a pharmaceutical agent such as an antithrombotic agent, an antimicrobial agent, or a growth factor.

The sphericity of the particles is 1.45 or less, but in terms of obtaining a more excellent adhesive strength to a biological tissue, the sphericity is preferably 1.29 or less, more preferably 1.20 or less, and further preferably 1.15 or less. As used herein, the sphericity means a value determined by the following test procedure.

Test Method

A powder to be measured is sprinkled onto a scanning electron microscope stage with a carbon tape affixed thereto; then the particles not having adhered to the carbon tape are removed by air spray to prepare a sample, which is observed with a scanning electron microscope; and the lengths of the horizontal axis and vertical axis of 20 particles randomly sampled from one field of view are measured using "ImageJ (v1.51)". Next, the "horizontal axis/vertical axis" ratio is calculated for each particle. The calculated values are arithmetically averaged, then the obtained averaged value is rounded to the second decimal place to obtain a sphericity. In the above measurement and calculation, the vertical axis and the horizontal axis are defined as (vertical axis)≤(horizontal axis). In other words, the largest value of the measured particle diameters per particle is defined as the length of the horizontal axis. The length of the vertical axis is the diameter at a position rotated from the horizontal axis at 90 degrees.

The standard deviation (SD) of sphericity of the above particles in the powder is 0.25 or less, but in terms of obtaining a more excellent adhesive strength to a biological tissue, it is preferably 0.20 or less, and more preferably 0.15 or less.

The standard deviation of sphericity of particles in the powder is calculated from the above-described sphericity of 20 particles, and the obtained calculated value is rounded to the second decimal position to obtain a standard deviation.

The average particle diameter of the particles is usually 0.5 to 50 μm, preferably 1 to 30 μm, more preferably 1 to 10 μm. The "average particle diameter" as used herein is a value obtained by measuring the particle diameters (longer diameters) of randomly sampled 100 particles by an electron microscope and averaging the measured diameters.

<Cross-Sectional Area of Gel Layer>

The present powder preferably has a cross-sectional area of a gel layer being 0.010 $mm^2$ or more in a test of measuring a cross-sectional area of a gel layer. When the cross-sectional area of a gel layer is 0.010 $mm^2$ or more, it can provide a more excellent adhesive strength for the powder as applied to a biological tissue.

The cross-sectional area of a gel layer is not particularly limited, but it is more preferably 0.020 $mm^2$ or more, further preferably 0.030 or more, still more preferably 0.050 or more, particularly preferably 0.100 or more, and most preferably 0.120 or more.

The upper limit value of the cross-sectional area of a gel layer is not particularly limited but is generally preferably 0.500 $mm^2$ or less.

As used herein, the "test of measuring a cross-sectional area of a gel layer" can be carried out as follows: a powder to be measured is sprayed onto a surface of an esophageal submucosal tissue at an amount of 100 mg per 2.5 cm×2.5 cm, and the tissue is left to stand at 37° C. for 48 hours to form a gel on the surface of the tissue. The formed gel is fixed with neutral buffered formalin to obtain a fixed gel. The obtained fixed gel is observed with a phase contrast microscope. Typically, the width and the thickness of the gel are measured from a phase contrast microscope image, and the cross-sectional area of the gel is calculated in square millimeters. This test is performed three times, and an arithmetic mean of the three calculated values is taken as a cross-sectional area of the gel layer. To confirm the gel layer, it is convenient to stain the gel with hematoxylin-eosin to obtain a stained gel. The resulting stained gel may be observed with a phase contrast microscope to determine a cross-sectional area of the gel from the phase contrast microscope image.

Figure 5:
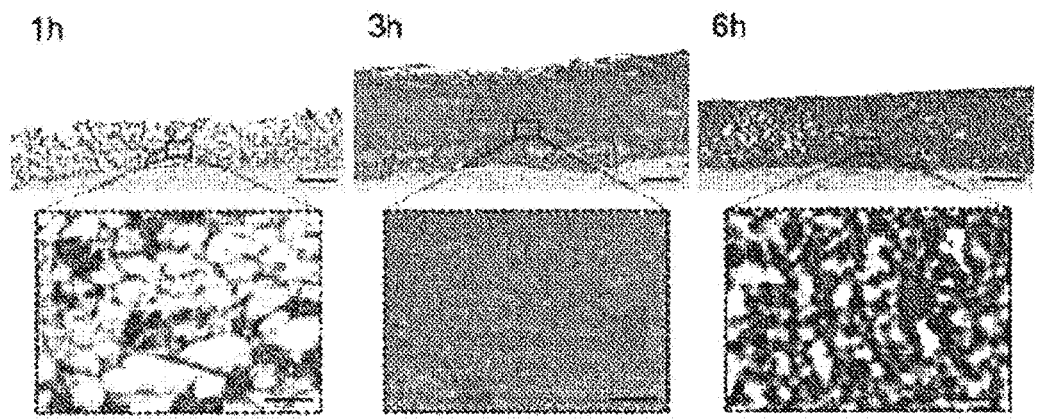
FIG. 5 is exemplary phase contrast microscope images used to measure cross-sectional areas of gel layers.

The phase contrast microscope images shown in FIG. 5 are cross-sectional images of a stained gel, and the area of the gel layer is calculated from the ratio of a stained gel in a cross-sectional image with a known area. Specifically, the area of a gel layer is calculated from a phase contrast microscope image by binarization with "ImageJ (v1.51)".

[Method of Producing Powder]

A method for producing the powder is not particularly limited, but the powder is preferably produced by a method comprising the following steps:

Step 1: dissolving a gelatin derivative in a good solvent to obtain a gelatin solution containing the gelatin derivative and the good solvent;

Step 2: adding a poor solvent to the gelatin solution to deposit intermediate particles containing the gelatin derivative in the gelatin solution;

Step 3: lyophilizing the gelatin solution after the deposition to obtain an intermediate powder containing the intermediate particles;

Step 4: crosslinking the gelatin derivative in the intermediate particles to obtain a powder comprising particles containing the crosslinked gelatin derivative; and Step 5: optionally further irradiating the powder comprising the particles containing the crosslinked gelatin derivative with ultraviolet light to hydrophilize surfaces of the particles.

Hereinafter, each step above is described in detail.

Step 1 (Dissolution Step)

Step 1 is to obtain a gelatin solution by dissolving a gelatin derivative, described above, in a good solvent. As used herein, the "good solvent" means a solvent that readily dissolves the gelatin derivative. Examples thereof include, but are not particularly limited to, water, glycerin, acetic acid, and mixtures thereof, and among them, a solvent containing water is preferred. The good solvent may be heated. The temperature upon heating is not particularly limited, but is preferably 50 to 70° C.

A method for dissolving a gelatin derivative in a good solvent is not particularly limited, and a known method can be used. Examples thereof include a method of adding a good solvent at low temperature (e.g., at room temperature) to a gelatin derivative to swell the gelatin derivative, and heating the resulting swelled material to obtain a gelatin solution (swelling dissolution method), and a method of adding a gelatin derivative to a good solvent that has been heated in advance to obtain a gelatin solution (direct dissolution method).

The content of a gelatin derivative in a gelatin solution is not particularly limited, but the content (final concentration) of a gelatin derivative relative to the total volume of the gelatin solution is preferably 0.01 to 30% by mass/volume, more preferably 1 to 25% by mass/volume, further preferably 5 to 20% by mass/volume, and particularly preferably 5 to 15% by mass/volume.

When the content of gelatin in a gelatin solution is within the above range, the obtained powder tends to have particles with a smaller standard deviation of sphericity.

Step 2 (Deposition Step)

Step 2 is to add a poor solvent to the gelatin solution to deposit intermediate particles containing the gelatin derivative in the gelatin solution.

As used herein, the poor solvent means a solvent that is more difficult to dissolve the gelatin derivative as compared to the good solvent used in Step 1. That is, as used herein, the good solvent and the poor solvent are relatively defined based on a relation between a possible poor solvent and a possible good solvent, rather than by the absolute amount of solubility of the gelatin derivative.

The poor solvent is not particularly limited, and examples thereof include an organic solvent. Especially, a water-soluble organic solvent is preferred, and alcohols, such as methanol, ethanol, propanol, isopropanol, butanol, and t-butyl alcohol, is more preferred.

A poor solvent is added to a gelatin solution to deposit intermediate particles in the gelatin solution. The intermediate particles contains a gelatin derivative. The particle diameter of the intermediate particles deposited in this step is not particularly limited, but is preferably 0.1 to 100 µm, more preferably 1 to 50 µm, and further preferably 1 to 10 µm.

When particle diameters are within the above range, intermediate particles deposited in a gelatin solution are more difficult to be precipitated, and it is advantageous to freeze and further lyophilize a whole gelatin solution containing intermediate particles in Step 3 described later in terms of suppressing aggregation of the intermediate particles. As a result, the sphericity of particles obtained in Step 4 is likely to be within a desired range.

The temperature upon addition of a poor solvent is not particularly limited, but is generally preferably 10 to 30° C., more preferably 15 to 25° C. When a solvent is heated to dissolve a gelatin derivative in Step 1, the method preferably further comprises a step of cooling a gelatin solution between Step 1 and Step 2.

When a poor solvent is added dropwise, the gelatin solution is preferably stirred. A method for stirring is not particularly limited, and a known method can be used. Addition of a poor solvent while stirring a gelatin solution makes it more difficult that the deposited particles are aggregated or precipitated. As a result, a powder comprising particles having desired properties is more easily obtained.

Step 3 (Drying Step)

Step 3 is to lyophilize a dispersion of un-crosslinked gelatin particles resulting from the deposition by the above-described coacervation to obtain an intermediate powder comprising particles containing the un-crosslinked gelatin derivative.

A method for freezing a gelatin solution is not particularly limited, but it is preferred to freeze a gelatin solution more rapidly in view of suppressing aggregation of particles containing the un-crosslinked gelatin derivative when freezing the gelatin solution. In this case, the ambient temperature upon freezing is not particularly limited, but is preferably −20° C. or lower, more preferably −30° C. or lower.

A method for lyophilizing is not particularly limited, and a known method can be used.

An intermediate powder comprises intermediate particles. The intermediate powder may comprise components other than the intermediate particles. Examples of such components include a good solvent and a poor solvent described above.

Step 4 (Crosslinking Step)

Step 4 is to crosslink a gelatin derivative in intermediate particles to obtain a powder containing a crosslinked gelatin derivative. Through this step, the gelatin derivative in the particles is irreversibly crosslinked intermolecularly and/or intramolecularly. As a result, a powder comprising particles containing a crosslinked gelatin derivative is obtained.

A method for crosslinking includes, but are not particularly limited to, a method of imparting thermal energy to a gelatin derivative and a method of irradiating a gelatin derivative with activated ray or radiation (e.g., electron ray).

Among them, a method of imparting thermal energy, i.e., heating (thermal crosslinking) is preferred in terms of more easily obtaining a crosslinked product of the gelatin derivative and of safety due to no impurities derived from a crosslinking agent. In this method, for example, an amino group and another reactive group (such as a carboxy group and a mercapto group) in a gelatin derivative react to form a crosslinked structure.

A method for thermal crosslinking is not particularly limited, and a known method can be used. The method of thermal crosslinking, for example, comprises placing a container including a powder precursor in a heated atmosphere (e.g., an oven), and maintaining the container for a predetermined period.

The heating temperature upon thermal crosslinking is not particularly limited, but it is generally preferred to be 80 to 200° C., and more preferably 100 to 200° C.

The heating time upon thermal crosslinking is not particularly limited, but it is generally preferably 0.1 to 20 hours, more preferably 0.5 to 10 hours, further preferably 1 to 6 hours, still more preferably 2 to 5 hours, and particularly preferably 2.5 to 4 hours.

When the heating time is within the above numerical range, an obtained powder tends to have a more excellent adhesiveness.

A crosslinked gelatin derivative may be obtained by reacting a gelatin derivative with a crosslinking agent. The crosslinking agent includes, but are not particularly limited to, genipine, a polybasic acid activated with N-hydroxysuccinimide or N-sulfoxysuccinimide, an aldehyde compound, an acid anhydride, a dithiocarbonate, and a diisothiocyanate.

A crosslinking agent also includes the compounds described on paragraphs 0021 to 0024 in WO 2018/079538, the contents of which are incorporated herein by reference.

Step 5 (Step of Hydrophilizing Particle Surface)

Step 5 is to further irradiate particles containing a crosslinked gelatin derivative with ultraviolet light to hydrophilize the surfaces of the particles. This surface treatment by ultraviolet light irradiation reduces a contact angle of a water droplet with the particles, making the particles easier to swell in the presence of moisture. Meanwhile, the particles after ultraviolet light radiation, when contacted with a tissue in a dry state, still have excellent adhesiveness.

The conditions of ultraviolet light irradiation are not particularly limited, but usually the irradiation is performed for 1 to 10 hours, more preferably for 2 to 8 hours, and further preferably for 3 to 6 hours. The intensity of Pltraviolet irradiation is preferably 0.05 to 50 mW/cm$^2$, and more preferably 0.5 to 10 mW/cm$^2$. The total dose of ultraviolet irradiation is preferably 1 to 100 J/cm$^2$, and more preferably 5 to 100 J/cm$^2$.

An ultraviolet light irradiation device is not particularly limited, and a commercially available device may be used.

During irradiation, particles may be preferably mixed periodically (for example, at every 30 minutes) so that the particles are evenly irradiated with ultraviolet light. The surfaces of the particles irradiated with ultraviolet light are hydrophilic, and it is therefore preferable to store the particles in a dry atmosphere, such as in the presence of a drying agent, when storing.

<Application of Powder>

A powder according to an embodiment of the present invention can be used as a wound dressing material. The wound dressing material can be applied to, although not particularly limited to, incisions in surgical procedures of respiratory surgery (especially wounds following lung cancer surgery), gastrointestinal surgery, cardiovascular surgery, oral surgery and gastrointestinal medicine or the like; and to skin wounds.

In the case of endoscopic submucosal dissection (ESD), the powder can be applied in a dry state with hemostatic forceps, a stent, a balloon, an endoscope, and the like. The application amount of the powder can be appropriately adjusted depending on the site of application and wounds.

A powder according to an embodiment of the present invention is characterized in that, after exerting a wound dressing effect, the powder is rapidly decomposed and absorbed along with wound healing.

The present powder can be also used as an anti-adhesion material. (Postoperative) adhesion is a phenomenon that occurs in the process of repair of a biological tissue damaged by surgery and the like. An anti-adhesion material comprising the present powder is sprayed onto an affected area to adhere to the tissue surface at the applied site and form a gel-like coating, which serves as a physical barrier, and exerts an anti-adhesion effect. Furthermore, the present powder is characterized in that, after exerting the antiadhesion effect, the gel-like coating is rapidly decomposed and absorbed.

A powder according to an embodiment of the present invention can be also used for forming a material having both the two functions of wound dressing and anti-adhesion. For example, when the powder is applied to a postoperative wound area, a membrane having a wound dressing effect and an anti-adhesion effect is formed.

Compared to a conventional wound dressing material and a conventional antiadhesion material which have been separately used, the powder can achieve both the functions more easily.

A powder according to an embodiment of the present invention is excellent in blood coagulation ability and can be used as a hemostatic material. The powder can be also used for forming a material having blood coagulation ability in addition to the functions of wound dressing and anti-adhesion.

EXAMPLES

Hereinafter, the present invention is described in further detail based on Examples. The materials, amounts, percentages, conditions of process, process procedures and the like shown in the following Examples can be changed as appropriate, unless departing from the spirit of the present invention. Accordingly, the present invention is not to be construed as limited by the following Examples.

[Preparation of Gelatin Derivative (1)]

The gelatin derivative "76.8C6 ApGltn" was prepared by the following procedure.

10 g of alkali-treated gelatin derived from Alaska Pollack (Mw=31000, "beMatrix fish gelatin TA (brand name)", manufactured by Nitta Gelatin Inc., amino group amount as measured by the method described below: 324 μmol/g; hereinafter the gelatin is sometimes referred to as "Org ApGltn") was added to 50 mL of ultrapure water-ethanol mixture solvent in an eggplant flask in an oil bath at 50° C. The mixture was stirred for about 2 hours to dissolve the gelatin to prepare a 20% by mass aqueous solution.

Next, to the obtained aqueous solution, picoline borane was added at 1.5 equivalents to hexanal (manufactured by Junsei Chemical CO., Ltd.), and then hexanal (manufactured by Tokyo Chemical Industry Co., Ltd.) at two equivalents to the amino groups of gelatin (a molar ratio of hexanal to 1 mole of the amino groups of gelatin) was added.

Next, a reflux condenser was installed in the eggplant flask, and the mixture was allowed to react with stirring at 50° C. for 17 hours.

The reaction solution was then added dropwise to 1 L of ethanol and precipitated. The mixture was stirred for 1 hour, then left still in a freezer for 1 hour, and then filtered through a glass filter. The filtration residue was again placed into 1 L of ethanol in a beaker and reprecipitated, and after stirring for 1 hour, the mixture was left still in a freezer for 1 hour. After filtration again with a glass filter, the filtration residue was dried overnight or longer in a vacuum dryer to obtain a gelatin derivative to which a hexyl group was introduced at a yield of 91%.

The introduction rate of the hexyl group in the obtained gelatin derivative was determined by the following method.

First, the original gelatin and the gelatin derivative each were dissolved in a water/dimethylsulfoxide (DMSO) mixed solvent (volume ratio 1:1, the same hereinafter) at 0.1% by mass/volume, respectively, and 100 μl of the solutions were dispensed into 48-well plates.

To these solutions, 100 μl of 0.1% by volume/volume triethylamine (TEA, manufactured by Nacalai Tesque Inc.) dissolved in a water/DMSO mixed solvent was added, and the mixtures were stirred with a plate shaker at 400 rpm for 1 minute. Further, 100 μl of 0.1% by mass/volume trinitrobenzene sulfonic acid (TNBS, manufactured by Wako Pure Chemical Co., Ltd.) dissolved in a water/DMSO mixed solvent was added, and the mixtures were stirred with a plate shaker at 400 rpm for 1 minute. The 48-well plates were left still in an incubator at 37° C. for 2 hours while the light was shielded with aluminum foil. Then, the 48-well plates were removed from the incubator, and 50 μl of 6N HCl was added to the mixtures to stop the reaction, and the mixtures were stirred with a plate shaker at 400 rpm for 1 minute.

Next, the mixtures were left still for 10 minutes while the light was shielded, and then absorbance (Abs) at 340 nm was measured with an absorbance meter (manufactured by TECAN, Spark 10M-NMST). From the measured absorbance, the absorbance of a blank sample that was only different in terms of gelatin free was subtracted, and an introduction rate of hexyl groups in the gelatin derivative was determined by the following formula to be 76.8 mol %:
Introduction rate (mol %)=[Abs(original gelatin)−Abs(gelatin derivative)]/[Abs(original gelatin)]×100.

The gelatin derivative obtained by the above method is referred to as "76.8C6". Hereinafter, gelatin derivatives were respectively obtained with hexanal as described above, or in place of hexanal, with octanal, heptanal, decanal and dodecanal, by adjusting the rates of the charged amounts thereof to that of the original gelatin so as to produce various introduction rates. In the Examples below, each gelatin derivative is designated and indicated by "(introduction rate of hydrophobic groups) (carbon number of aldehyde used for derivatization)". For example, the term "10.6C6" indicates that hexanal was used and the introduction rate of hexyl group was 10.6 mol %.

[Preparation of Powder (1)]

0.5 g of each gelatin derivative obtained by the above method was weighed into a vial with scale (50 mL), and 7.5 mL of MilliQ® water was added.

Next, after dissolving the gelatin derivative with a water bath at 50° C., the mixture was diluted up to 10 mL with MilliQ water.

At this time, the content (final concentration) of the gelatin derivative in the gelatin solution was adjusted to 5% by mass/volume, which was changed as appropriate depending on the gelatin species and experimental conditions.

Next, ethanol (EtOH) was added dropwise with stirring by a stirrer bar at room temperature until the gelatin solution was cloudy, in order to obtain a gelatin solution containing intermediate particles.

Then, the gelatin solution was left still in a freezer (−30° C.) for 2 hours or more. The vial was then removed from the freezer, and the opening of the vial was covered with Kimwipes®, and the gelatin solution was lyophilized to obtain an intermediate powder containing intermediate particles. The resulting intermediate powder was crosslinked by heating at 150° C. for 6 hours to obtain each powder. Hereinafter, the method of preparing a powder described herein is simply referred to as "Method A-1"

[Preparation of Powder (2)]

Each gelatin derivative obtained by the above method was dissolved in water heated in a water bath at 50° C. to obtain a gelatin solution at a gelatin concentration of 5% by mass/volume. The gelatin solution was then poured into a container made of tetrafluoroethylene, the container was placed on a heater at 40° C., and the solvent was distilled. The resultant dried gelatin was then grinded with a grinder (Wonder Crusher). The grinding was performed by repeating three times a cycle procedure under the conditions of 20 seconds at Speed 5 and 1 minute at Speed 10.

The ground intermediate powder was crosslinked by heating in the same manner as above to obtain a powder. Hereinafter, the method of preparing a powder described herein is simply referred to as "Method B".

[Preparation of Powder (3)]

Each gelatin derivative obtained by the above method was dissolved in ultrapure water at 50° C. to obtain a gelatin solution at a gelatin concentration of 6% by mass. Then, the same volume of ethanol was added to dilute the above aqueous solution such that the gelatin concentration was 3% by mass to obtain a diluted solution. Next, the diluent was maintained at 50° C. and installed in a spray dryer device (Mini spray dryer, B-290, manufactured by BUCHI Labortechnik AG). The flow rate of the nitrogen gas was adjusted to 440 L/h at 180° C., and the flow rate of the diluted solution was adjusted to 410 mL/h to obtain an intermediate powder comprising intermediate particles. The obtained intermediate powder was crosslinked by heating in the same manner as described above to obtain a powder. Hereinafter, the method of preparing a powder described herein is simply referred to as "Method C".

The powder prepared by "Method A-1" with the gelatin derivative "76.8C6 ApGltn" was taken as Example 1. The powder prepared by "Method B" with the gelatin derivative "76.8C6 ApGltn" was taken as Example 2.

The powder prepared by "Method A-1" with "Org ApGltn" was taken as Example 3. In all the cases, the crosslinking time was set to 6 hours.

The powder prepared by "Method C" with a gelatin derivative "75C8 pig gelatin" was taken as Example 4, wherein the gelatin derivative was prepared by the method described in "Preparation of Gelatin Derivative" except that alkali-treated gelatin derived from pig skin (Mw=100,000, beMatrix (brand name), manufactured by Nitta Gelatin Inc.) was used as a raw material.

Each of the resulting powders was observed with a scanning electron microscope, and a sphericity and standard deviation were determined from the obtained images by the following method. The scanning electron microscope images are shown in FIGS. 1 to 4, and the sphericities and the standard deviations are shown in Table 1. FIGS. 1 to 4 correspond to Examples 1 to 4, respectively.

[Observation by Scanning Electron Microscope (1)]

The powder of each Example was sprinkled onto a scanning electron microscope stage with a carbon tape affixed thereto; then a sample prepared by removing the powder not adhering to the carbon tape by air spray was observed with a scanning electron microscope.

[Calculation Method of Sphericity and Standard Deviation (1)]

Sphericity

The lengths of the horizontal axis and vertical axis of 20 particles randomly sampled from one field of view were measured with "ImageJ (v1.51)". Herein, the vertical axis and the horizontal axis were defined as (vertical axis)≤ (horizontal axis), and the largest particle diameter was defined as the length of the horizontal axis. The vertical axis was defined as a diameter at the position 90 degrees-rotated from the horizontal axis.

Next, the "horizontal axis/vertical axis" ratio was calculated for each particle; the calculated values were arithmetically averaged; then the third decimal place of the obtained averaged value was rounded to the second decimal place to obtain a sphericity.

Standard Deviation of Sphericity

A standard deviation of sphericities of the particles in a powder was calculated from the sphericity of each of the 20 particles as described above. The calculated value was rounded to the second decimal position.

TABLE 1

| | Gelatin derivative | Preparation method | Sphericity | Standard deviation of sphericity |
|---|---|---|---|---|
| Example 1 | 76.8C6 ApGltn(Mw: 31,000) | Method A-1 | 1.08 | 0.06 |
| Example 2 | 76.8C6 ApGltn(Mw: 31,000) | Method B | 1.49 | 0.32 |
| Example 3-1 | Org ApGltn(Mw: 31,000) | Method A-1 | 1.07 | 0.06 |
| Example 4 | 75C8 pig gelatin | Method C | 1.30 | 0.28 |

From the results described in Table 1, it was found that the powders prepared by Method A-1 had desired sphericities and standard deviations.

[Measurement Test of Adhesive Strength to Porcine Inner Gastric Wall Tissue (1)]

Adhesive strengths of the powders to porcine inner gastric wall tissue were measured by the following method. The method was performed in accordance with the standard of American Society for Testing and Materials (ASTM F-2258-05). A pig stomach was opened, and a mucosal layer was removed. At this time, physiological saline was injected into the submucosal tissue, and the raised portions were removed to only excise the mucosal layer while leaving some submucosal tissues. The obtained tissue was cut into 2.5 cm square pieces and fixed onto each of the upper and lower jigs of a test device with an instantaneous adhesive. The temperature of the porcine inner gastric wall tissue during measurement was maintained at 37° C. by a hot plate.

Next, the industrial paper cloth (brand name "Kim-Wipes") was pressed onto the tissue surface described above to remove excess moisture. The tissue was then compressed at 50 N for 3 minutes, and water oozed therefrom was removed again.

Next, 100 mg of the powder was placed on the tissue. The powder was then pressed at 80 kPa with the upper jig for 3 minutes, and then pulled upward to measure an adhesive strength (kPa).

Then, the ratio of the adhesive strength of the powders of Examples 1 and 2 was determined relative to the adhesive strength of the powder of Example 3-1 which was taken as 1.0. The results are shown in Table 2.

TABLE 2

| | Gelatin derivative | Preparation method | Ratio of adhesive force | Sphericity | Standard deviation of sphericity |
|---|---|---|---|---|---|
| Example 1 | 76.8C6 ApGltn(Mw: 31,000) | Method A-1 | 2.4 | 1.08 | 0.06 |
| Example 2 | 76.8C6 ApGltn(Mw: 31,000) | Method B | 1.8 | 1.49 | 0.32 |
| Example 3-1 | Org ApGltn(Mw: 31,000) | Method A-1 | 1.0 | 1.07 | 0.06 |

In Table 2, Examples 1 to 3-1 show the results of the same powders as those of Examples 1 to 3-1 in Table 1, respectively. According to the above results, it was found that the powder of Example 1 has a more excellent adhesive strength to a tissue as compared to the powders of Example 2 and Example 3-1.

The same test as above was performed on pig gelatin (Mw: about 40,000, Lot No. 180425, manufactured by Nitta Gelatin Inc., hereinafter the gelatin is referred to as "Org pig gelatin"). In other words, the powders of Examples A to C below were prepared with the pig gelatin as a raw material.

Example A: Org pig gelatin, Method A-1
Example B: 78.7C6 pig gelatin, Method A-1
Example C: 78.7C6 pig gelatin, Method B The relative adhesive strengths were determined for the above powders, and it was found that Example C was 0.7 and Example B was 1.1 when Example A was taken as 1.0. From the above, it was found that similar results can be obtained regardless of the origin of a raw material.

[Preparation of Gelatin Derivative (2)]

A gelatin derivative was prepared in the same manner as in [Preparation of Gelatin Derivative (1)] described above except that octanal (manufactured by Tokyo Chemical Industry Co., Ltd.) was mixed into the gelatin solution at an amount corresponding to two equivalents to the amino groups of gelatin. The introduction rate of octyl group was measured in the same manner as in [Preparation of Gelatin Derivative (1)] described above, and it was confirmed that the introduction rate of octyl group was 57.7. Hereinafter, the obtained gelatin derivative is referred to as a gelatin derivative "57.7C8 ApGltn."

[Preparation of Powder (4)]

A powder was prepared by the same manner as in "Method A-1" with the gelatin derivative obtained in [Preparation of Gelatin Derivative (2)] described above. The powder obtained by this method was taken as Example 5.

[Preparation of Gelatin Derivative (3)]

A gelatin derivative was prepared in the same manner as in [Preparation of Gelatin Derivative (1)] described above except that decanal (manufactured by Tokyo Chemical Industry Co., Ltd.) was mixed into the gelatin solution at an amount corresponding to two equivalents to the amino groups of gelatin. The introduction rate of decyl group was measured in the same manner as in [Preparation of Gelatin Derivative (1)] described above, and it was confirmed that the introduction rate of decyl group was 46.1. Hereinafter, the obtained gelatin derivative is referred to as a gelatin derivative "46.1C10 ApGltn".

[Preparation of Powder (5)]

Powders were prepared with the gelatin derivative obtained in [Preparation of Gelatin Derivative (3)] described above, in the same manner as in "Method A-1", or in the same manner as in "Method A-1" except that crosslinking by heating was performed for 1 hour or 3 hours. These methods, which altered the thermal crosslinking time, were referred to as "Method A-2" and "Method A-4", and the resulting powders were taken as Example 6-1, Example 6-2, and Example 6-3, respectively.

[Preparation of Gelatin Derivative (4)]

The gelatin derivative was prepared in the same manner as in [Preparation of Gelatin Derivative (1)] above, except that dodecanal (manufactured by Tokyo Chemical Industry Co., Ltd.) was mixed into the gelatin solution at an amount corresponding to two equivalents to the amino groups of gelatin. The introduction rate of dodecyl group was measured in the same manner as in [Preparation of Gelatin Derivative (1)] above, and it was confirmed that the introduction rate of dodecyl group was 48.6. Hereinafter, the obtained gelatin derivative is referred to as a gelatin derivative "48.6C12 ApGltn."

[Preparation of Powder (6)]

A powder was prepared by the same manner as in "Method A-1" with the gelatin derivative obtained in [Preparation of Gelatin Derivative (4)] described above. The powder obtained by this method was taken as Example 7.

[Measurement of Adhesive Strength to Porcine Inner Gastric Wall Tissue (2)]

The adhesive strengths of the powders of Example 3-1, Example 1, and Examples 5 to 7 to porcine inner gastric wall tissue were measured in accordance with the standard of American Society for Testing and Materials (ASTM F-2258-05). The details of the test method are as described in [Measurement Test of Adhesive Strength to Porcine Gastric Inner Wall Tissue (1)].

[Measurement of Gel Layer Cross-Sectional Area]

The powders were measured for the cross-sectional areas of the gel layers by the following method. A powder to be measured was sprayed onto the surface of an esophageal submucosal tissue at an amount of 100 mg per 2.5 cm×2.5 cm of the surface, and the tissue is left to stand at 37° C. for 48 hours to form a gel on the surface of the tissue. The gel was fixed with neutral buffered formalin to obtain a fixed gel. The obtained fixed gel was observed with a phase contrast microscope. The width and the thickness of the gel were determined from a phase contrast microscope image, and a cross-sectional area was calculated in square millimeters. This test was performed three times, and an arithmetic mean value of the three calculated values was taken as a cross-sectional area of the gel layer.

The results are shown in Table 3.

In a preferred embodiment, the cross-sectional area of a gel layer is determined after making the gel visible with a dye such as by hematoxylin-eosin staining. For example, the cross-sectional area of a gel layer may be detected by the following method. A powder to be measured was sprayed onto the surface of an esophageal submucosal tissue at an amount of 100 mg per 2.5 cm×2.5 cm and left to stand at 37° C. for 48 hours to form a gel on the surface of the tissue. The gel was fixed with neutral buffered formalin to obtain a fixed gel, and the fixed gel was stained with hematoxylin-eosin to obtain a stained gel. The stained gel was observed with a phase contrast microscope (a cross-sectional image), and a phase contrast microscope image was binarized with "ImageJ (v1.51)" to calculate the cross-sectional area of a gel layer in square millimeters. This test was performed three times, and an arithmetic mean value of the three calculated values was taken as the cross-sectional area of a gel layer.

Exemplary phase contrast microscope images are shown in FIG. 5. The scale bars in FIG. 5 represent 1 mm in the upper row, and 100 μm in the lower row which shows partially enlarged views, respectively.

The indications 1h, 3h, and 6h in FIG. 5 correspond to Example 6-2 (1h), Example 6-3 (3h), and Example 6-1 (6h) in Table 3, respectively. In the upper row, cross-sectional images are shown, and, in the lower row, partially enlarged views are shown. From the results in FIG. 5, it was found that, in Example 6-3, a denser gel was formed, and the cross-sectional area of the gel layer was larger as compared to Example 6-2 and Example 6-1.

A larger cross-sectional area of a gel layer made of a powder means that the gel layer, tends to remain in a humid environment (in water), resulting that the gel layer (membrane) always covers a wound when the powder is applied to the wound. Adhesive strength is therefore expected to be more sustained. This also brings about a more excellent effect in terms of providing a scaffold for cell proliferation and migration to heal a wound.

From the results shown in FIG. 5, it was found that the cross-sectional area of a gel layer can be controlled by adjusting crosslinking conditions.

TABLE 3

| | | Crosslinking conditions | | Ratio of adhesive force | Area of gel layer (mm$^2$) |
|---|---|---|---|---|---|
| | Gelatin derivative | Temperature (° C.) | Time | | |
| Example 3-1 | Org ApGltn | 150 | 6 | 1.0 | 0.007 |
| Example 1 | 76.8C6 ApGltn | | | 1.2 | 0.004 |
| Example 5 | 57.7C8 ApGltn | | | 1.7 | 0.071 |
| Example 6-1 | 46.1C10 ApGltn | | | 2.1 | 0.119 |
| Example 6-2 | 46.1C10 ApGltn | | 1 | 2.0 | 0.029 |
| Example 6-3 | 46.1C10 ApGltn | | 3 | 2.6 | 0.190 |
| Example 7 | 48.6C12 ApGltn | | 6 | 1.7 | 0.036 |

The powders of Example 3-1, Example 1, Example 5, Example 6-1 to Example 6-3, and Example 7 were obtained by crosslinking the intermediate powder under conditions of 150° C. for 1 to 6 hours, and in all of the obtained powders, the sphericities were 1.45 or less, and the standard deviations were 0.25 or less.

As can be seen from the results shown in Table 3, the powders of Example 1, Example 5, Example 6-1 to Example 6-3 and Example 7 all had superior adhesive strengths as compared to the powder of Example 3-1.

Particularly, the powder of Example 5, wherein $R^2$ is a hydrogen atom and $R^1$ is an alkyl group having 7 or more carbon atoms, had a more excellent adhesive strength as compared to the powder of Example 1. The powder of Example 6-1, wherein $R^2$ is a hydrogen atom and $R^1$ is an alkyl group having 9 or more carbon atoms, had a more excellent adhesive strength as compared to the powder of Example 5. The powder of Example 6-1, wherein $R^2$ is a hydrogen atom and $R^1$ is an alkyl group having 11 or less carbon atoms, had a more excellent adhesive strength as compared to the powder of Example 7.

The powders of Example 5, Example 6-1 to Example 6-3, and Example 7, where the areas of the gel layers are 0.010 or more, had a more excellent adhesive strength as compared to the powder of Example 1, where the area of the gel layer is less than 0.010.

From the comparison of Examples 6-1 to 6-3, it was found that the cross-sectional area of a gel layer can be controlled by crosslinking times. The area of a gel layer is preferably 0.030 mm$^2$ or more, more preferably 0.110 mm$^2$ or more, and particularly preferably 0.120 mm$^2$ or more.

[Preparation of Gelatin Derivative (5)]

A gelatin derivative was prepared in the same manner as in [Preparation of Gelatin Derivative (1)] described above except that decanal (manufactured by Tokyo Chemical Industry Co., Ltd.) was mixed into the gelatin solution at an amount corresponding to two equivalents to the amino groups of gelatin. The introduction rate of decyl group was measured in the same manner as in [Preparation of Gelatin Derivative (1)] described above, and it was confirmed that the introduction rate of decyl group was 36.4. Hereinafter, the obtained gelatin derivative is referred to as a gelatin derivative "36.4C10 ApGltn."

[Preparation of Powder (7)]

A powder was prepared with the gelatin derivative obtained in [Preparation of Gelatin Derivative (5)] described above in the same manner as in "Method A-4" (crosslinking by heating for 3 hours). The powder obtained by this method was taken as Example 8.

A powder prepared by "Method A-4" with "Org ApGltn" was taken as Example 3-2.

[Surface Treatment by UV Irradiation (1)]

The powders of Examples 8 and 3-2 obtained by [Preparation of Powder (7)] were placed in a glass dish and left still in a UV irradiation box (manufactured by the National Institute for Materials Science). The particles were mixed every 30 minutes while irradiated with ultraviolet lights of 185 nm and 254 nm (source: UV lamp manufactured by MIYATA ELEVAM Inc.) at room temperature for different times of 1 hour, 2 hours and 4 hours to perform a surface treatment of the particles. The resulting powders were taken as Example 8 (U1), Example 8 (U2), Example 8 (U4), Example 3-2 (U1), Example 3-2 (U2), and Example 3-2 (U4), respectively. Also, as a control, the corresponding powders that were not subjected to UV irradiation were taken as Example 8 (U0) and Example 3-2 (U0), respectively.

[Measurement of Contact Angle with Water (1)]

For each of the powders of Example 8 (U1), Example 8 (U2), Example 8 (U4), Example 3-2 (U1), Example 3-2 (U2), and Example 3-2 (U4), a water contact angle was measured by water droplet method to evaluate the effect of the surface treatment.

20 mg of each powder was placed to be flat on a 1.5 cm×1 cm double-sided tape; 1 μl of ion exchange water was added dropwise; photographs of the shape of a water droplet were taken from the side of the water droplet ten times every 0.5 seconds from the time point of 1 second after dropping; the contact angle was measured from the shape of the water droplet photographed at the time point of 5 seconds after dropping, at that time which the shape of the water droplet became constant; and a mean value (n=10) was determined.

Figure 6:
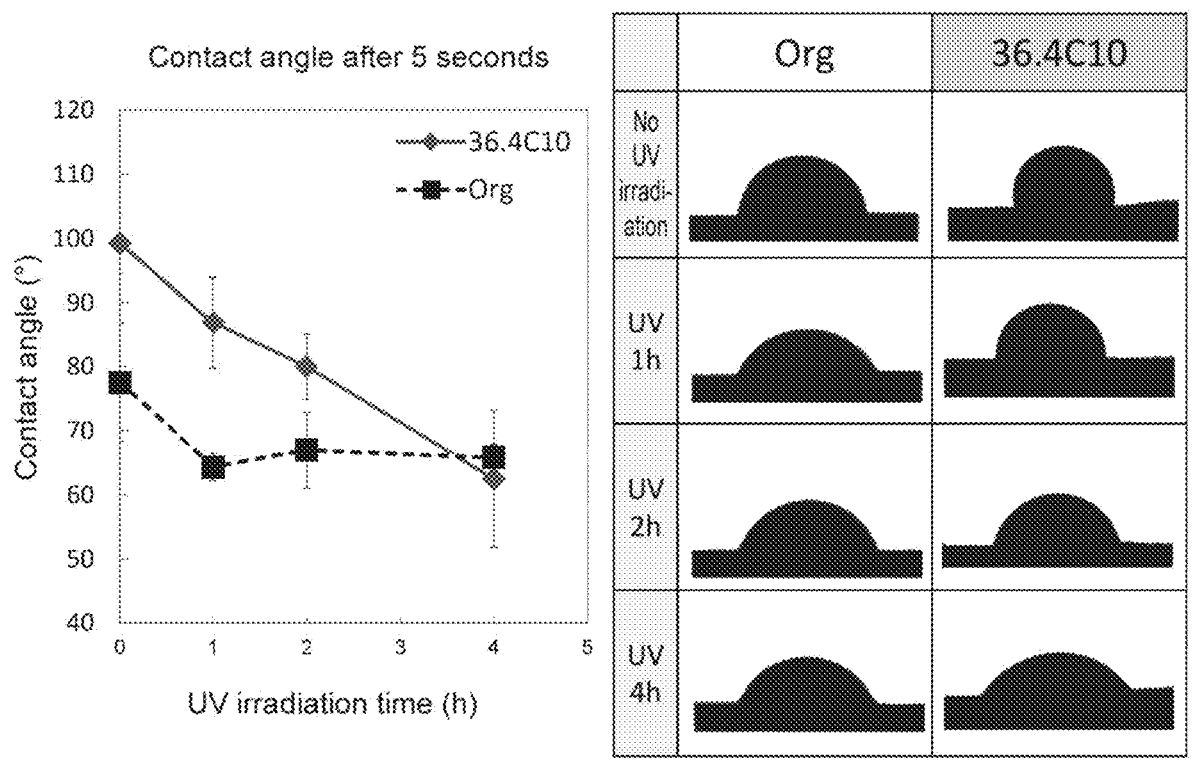
FIG. 6 shows the results of measuring the contact angles of water droplets with powders, where the powders were prepared from 36.4C10 ApGltn or Org ApGltn by Method A-4 or by further treating the surfaces of the prepared powers by UV irradiation for different times (30 minutes, 1 hour, 2 hours, and 4 hours). A graph on the left shows a relationship between UV irradiation times and the contact angles. A diagram on the right shows the status of water droplets observed in each test.

FIG. 6 is the images of water droplets and a graph showing the contact angles at the time point of 5 seconds after dropping. As shown in FIG. 6, the surface treatment by UV irradiation reduced the water contact angles of both powders of the crosslinked gelatin and the crosslinked gelatin derivative. In the particles of the crosslinked gelatin derivative, as the UV irradiation time increased, the contact angle became smaller. The contact angle of the powder that was UV irradiated for 4 hours was the same level as that of the crosslinked gelatin into which a hydrophobic group was not introduced.

[Measurement of Adhesive Strength to Porcine Inner Gastric Wall Tissue (3)]

Figure 7:
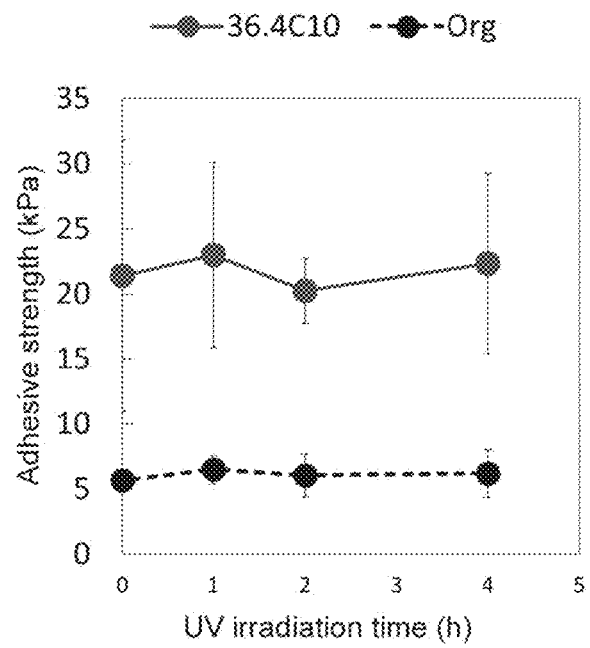
FIG. 7 shows the results of measuring the adhesive strength of powders to a porcine inner gastric wall, where the powders were prepared from 36.4C10 ApGltn or Org ApGltn by Method A-4 or treating the surfaces of the prepared powers by UV irradiation for different times (30 minutes, 1 hour, 2 hours, and 4 hours).

The adhesive strength of each powder of Example 8 (U1), Example 8 (U2), Example 8 (U4), Example 3-2 (U1), Example 3-2 (U2), and Example 3-2 (U4) to porcine inner gastric wall tissue was measured in accordance with the standard of American Society for Testing and Materials (ASTM F-2258-05). The details of the test method are as described in [Measurement Test of Adhesive Strength to Porcine Gastric Inner Wall Tissue (1)]. The test results are shown in FIG. 7.

None of the particles of Example 8 (U1), Example 8 (U2) and Example 8 (U4) and the powders of Example 3-2 (U1), Example 3-2 (U2), and Example 3-2 (U4) were affected in adhesive strength by the surface treatment by UV irradiation. The powders of the crosslinked gelatin derivative of Example 8 (U1), Example 8 (U2), and Example 8 (U4) exhibited about 4 times higher adhesive strengths relative to the powders of the crosslinked gelatin of Examples 3-2 (U1), 3-2 (U2), and 3-2 (U4).

[Observation with Scanning Electron Microscope (2)]

The powders of Example 8 (U0) and Example 8 (U4) and the powders of Example 3-2 (U0) and Example 3-2 (U4) were observed with a scanning electron microscope. As comparisons, the intermediate powders of 36.4C10 ApGltn and Org ApGltn before thermal crosslinking in the process of "Method A-4" were also observed with a scanning electron microscope. The preparation of samples for observation with the microscope is as described in [Observation by Scanning Electron Microscope (1)].

Figure 8:
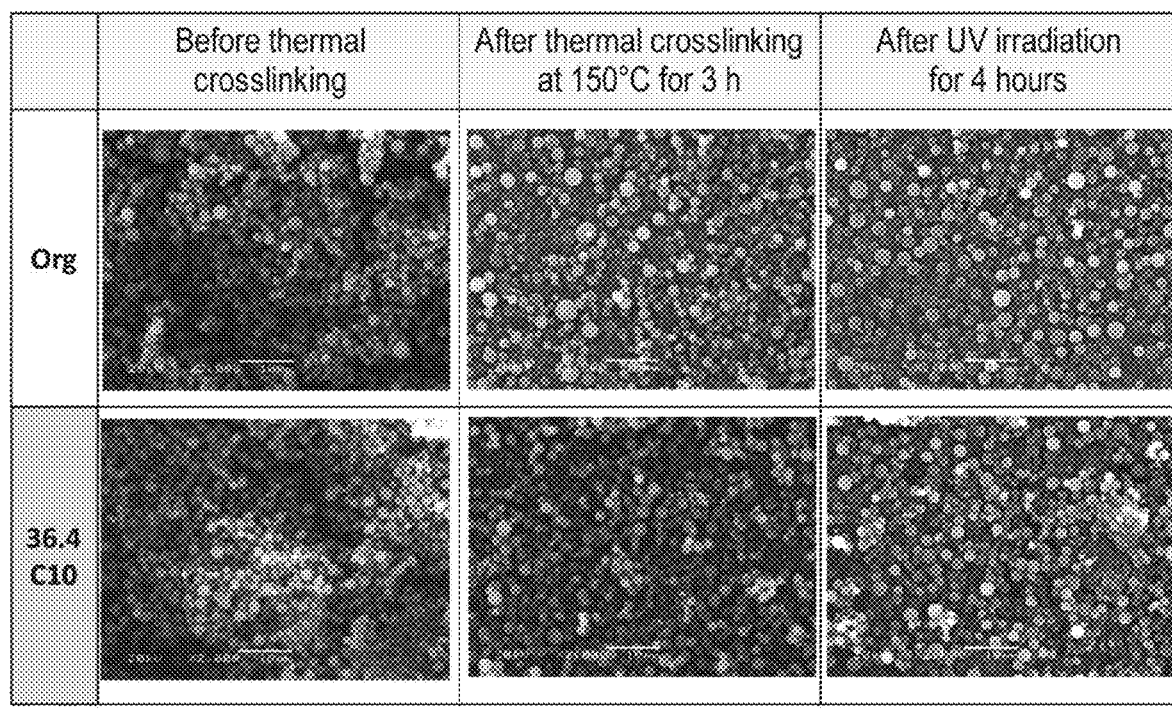
FIG. 8 is scanning type electron microscope images of powders before or after crosslinked by heat, wherein the powders were obtained in the course of the process of preparing powders from 36.4C10 ApGltn or Org ApGltn by Method A-4, or of powders obtained by further subjecting the crosslinked powers to a surface treatment by UV irradiation.

FIG. 8 shows a microscopic image of each powder. As understood from each image, no effect of thermal crosslinking and UV irradiation was observed on the particle shapes and sizes.

[Fusion of Particles in Saline]

Figure 9:
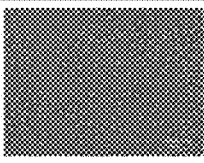
FIG. 9 is scanning type electron microscope images of powders after put into saline and left for different times (immediately, and 30 minutes, 1 hour, and 2 hours after stirring), wherein the powders were prepared from 36.4C10 ApGltn or Org ApGltn by Method A-4 or further subjecting the prepared powders to a surface treatment by UV irradiation.

10 mg of each of the powders of Example 8 (U0) and Example 8 (U4) and the powders of Example 3-2 (U0) and Example 3-2 (U4) was placed in a 2 ml tube, and 200 μl of saline at 30° C. was added. After stirring with vortex, each tube was left still in a thermostatic bath at 37° C. The powders in saline were removed from the tube immediately after stirring, and at 30 minutes, 1 hour and 2 hours after stirring, and observed with a scanning electron microscope. FIG. 9 shows microscopic images of the respective powders at the respective times. As understood from each image, 36.4C10 ApGltn particles were fused to form a membrane in an aqueous environment regardless of with or without UV irradiation.

Figure 10:
FIG. 10 is scanning type electron microscope images of micropore starch spheres (brand name: Bard Arista AH, Medicon Co., Ltd.) after put into saline and left for different times (immediately, and 30 minutes, 1 hour, 2 hours, 4 hours, and 24 hours after stirring).

For reference, a similar test was performed for a topical hemostatic material composed of microporous starch spheres (brand name: Bard Arista AH, Medicon Co., Ltd.), and the powders in saline were removed from the tube immediately after stirring, and at 30 minutes, 1 hour, 2 hours, 4 hours and 24 hours after stirring, and observed with a scanning electron microscope. FIG. 10 shows microscopic images of the powder at the respective times. As understood from each image, Arista AH maintained a spherical shape even in an aqueous environment with the particles being not fused to each other to form a membrane.

[Measurement of Adhesive Strength to Porcine Inner Gastric Wall Tissue (4)]

The adhesive strength of each powder swelled with saline as described above to porcine inner gastric wall tissue was measured in accordance with the standard of American Society for Testing and Materials (ASTM F-2258-05).

The test was performed as follows: 100 mg of a powder was placed on the tissue, and immersed in 50 ml of saline for 5 minutes, then fixed to the upper and lower jig of a test device with an adhesive, then pressed at 50 N with the upper jig for 3 minutes, and then pulled upward to measure the adhesive strength. Other details are as described in [Measurement Test of Adhesive Strength to Porcine Inner Gastric Wall Tissue (1)]. The test results are shown in FIG. 11.

Figure 11:
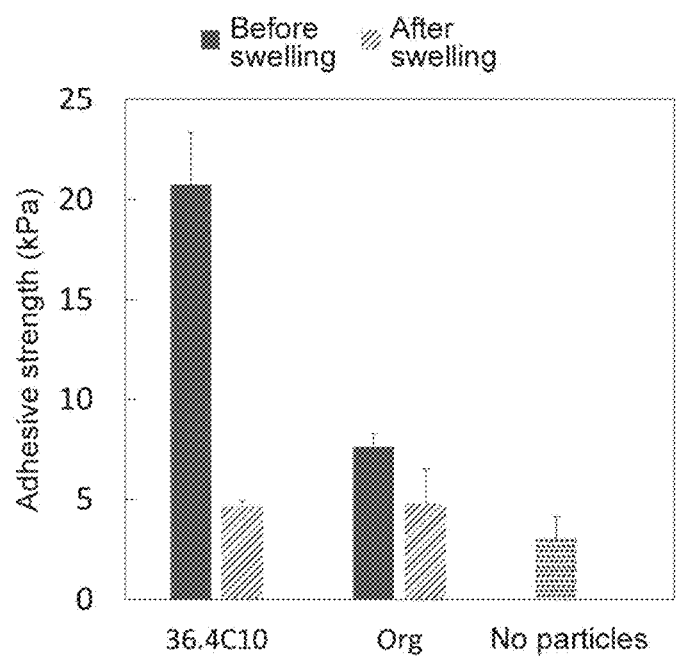
FIG. 11 shows the results of measuring the adhesive strength of powders to a porcine inner gastric wall tissue after put into saline and left for 5 minutes, wherein the powders were by prepared from 36.4C10 ApGltn or Org ApGltn by Method A-4 or further subjecting the prepared powders to a surface treatment by UV irradiation. The adhesive strength in case of no powder is also shown as a control.

As shown in FIG. 11, Both of the powder of Example 8 (U4), in which the powder is of a crosslinked gelatin derivative further surface-treated by ultraviolet light irradiation, and the powder of Example 3-2 (U4), in which the powder is of a crosslinked gelatin with no introduced hydrophobic group and further surface-treated by ultraviolet light irradiation, had reduced adhesive strengths after immersion in saline. In particular, the adhesive strength of the powder of Example 8 (U4) was at least four times less than when not immersed in saline, and at the same level as the powder of Example 3-2 (U4). Such characteristics are expected to allow adhesion to a biological tissue of interest and then reduced adhesion to other tissues on the exposed surface of the powder.

[Measurement of Contact Angle with Water (2)]

The change in contact angle with water over time was measured for the particles of Example 8 (U0) and Example 8 (U4), and the powders of Example 3-2 (U0) and Example 3-2 (U4).

Each powder was stored in a decimator and the contact angle with water was measured at the time point of immediately following UV irradiation, and the time points of 24 hours and 48 hours after UV irradiation. The test was performed as described in [Measurement of Contact Angle with Water (1)].

Figure 12:
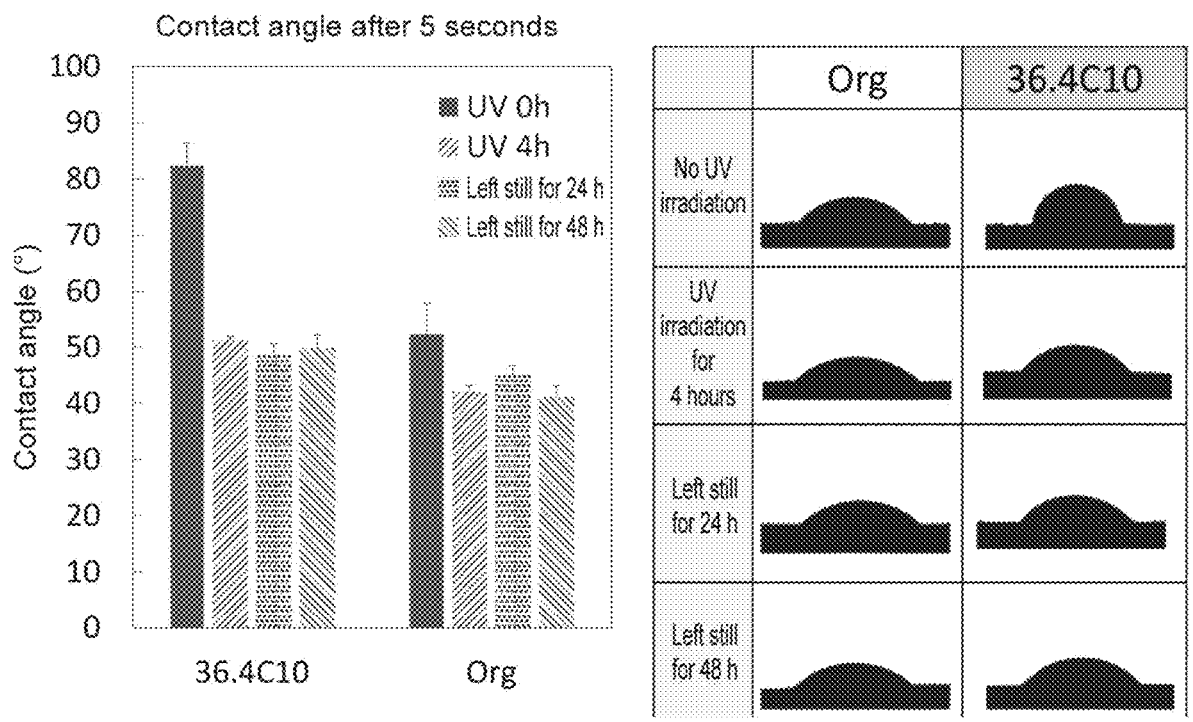
FIG. 12 shows the results of measuring the contact angles of water droplets with powders after left for a certain period of time (24 hours, 48 hours), wherein the powders were prepared from 36.4C10 ApGltn or Org ApGltn by Method A-4, or further subjecting the prepared powders to a surface treatment by UV irradiation. A graph on the left shows a contact angle under each condition. A diagram on the right shows the status of water droplets observed in each test.

FIG. 12 shows the images of water droplets and the contact angles at 5 seconds after dropping. As shown in FIG. 12, both the powder of Example 8 and the powder of Example 3-2 had decreased contact angles with the surface treatment by UV irradiation. Especially, the powder of Example 8 had a significantly decreased contact angle. On the other hand, the resting time after UV irradiation did not affect the contact angle.

[Preparation of Gelatin Derivative (6)]

A gelatin derivative was prepared in the same manner as in [Preparation of Gelatin Derivative (1)] described above except that decanal (manufactured by Tokyo Chemical Industry Co., Ltd.) was mixed into the gelatin solution at an amount corresponding to two equivalents relative to the amino groups of gelatin to obtain a gelatin derivative in a yield of 90%. The introduction rate of decyl group was measured in the same manner as in [Preparation of Gelatin Derivative (1)] described above, and it was confirmed that the introduction rate of decyl group was 44.2 mol %. Hereinafter, the obtained gelatin derivative is referred to as a gelatin derivative "44.2010 ApGltn".

[Preparation of Powder (8)]

Powders were prepared with the gelatin derivative obtained in [Preparation of Gelatin Derivative (6)] described above in the same manner as in "Method A-1" except that the crosslinking by heating was performed for 1 hour, 2 hours, or 3 hours. The method was referred to as "Method A-2", "Method A-3" and "Method A-4" and the powders obtained by these methods were taken as Example 9, Example 10 and Example 11, respectively.

[Surface Treatment by UV Irradiation (2)]

Each of the powders of Example 9, Example 10 and Example 11 obtained in [Preparation of Powder (8)] was placed in a glass dish and left still in a UV irradiation box (manufactured by the National Institute for Materials Science) The particles were mixed every 30 minutes while irradiated with ultraviolet lights of 185 nm and 254 nm (source: UV lamp manufactured by MIYATA ELEVAM Inc.) at room temperature for 4 hours to perform a surface treatment of the particles. The UV-irradiated powders are referred to as Example 9 (UV4), Example 10 (UV4), and Example 11 (UV4), respectively, and the non-UV-irradiated powders are referred to as Example 9 (UV0), Example 10 (UV0), and Example 11 (UV0), respectively.

[Measurement of Adhesive Strength to Porcine Inner Gastric Wall Tissue (5)]

Figure 13:
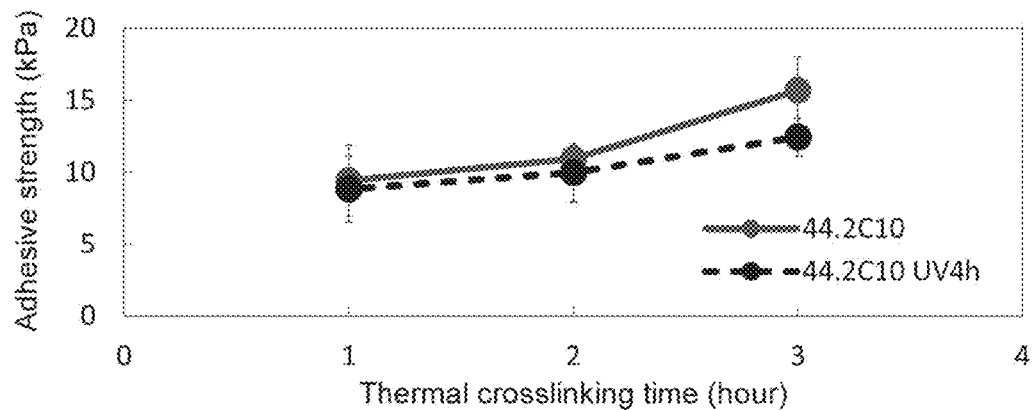
FIG. 13 shows the results of measuring the adhesive strength of powders to a porcine inner gastric wall tissue, wherein the powders were prepared from 44.2C10 ApGltn by Method A-2 (crosslinking time: 1 hour), Method A-3 (crosslinking time: 2 hours), or Method A-4 (crosslinking time: 3 hours) or further subjecting the prepared powders to a surface treatment by UV irradiation.

The adhesive strength of each of the powders of Example 9 (UV4), Example 10 (UV4), Example 11 (UV4), Example 9 (UV0), Example 10 (UV0) and Example 11 (UV0) to porcine inner gastric wall tissue was measured in accordance with the standard of American Society for Testing and Materials (ASTM F-2258-05). The details of the test method are as described in [Measurement Test of Adhesive Strength to Porcine Gastric Inner Wall Tissue (1)]. The test results are shown in FIG. 13.

Both the powders of the crosslinked and UV-irradiated gelatin derivatives and the powders of the crosslinked and non-UV-irradiated gelatin were also found to tend to have a larger adhesive strength as the thermal crosslinking time was longer. This tendency was greater in the powders of the crosslinked gelatin derivative without a surface treatment by UV irradiation.

[Measurement of Contact Angle with Water (3)]

Figure 14:
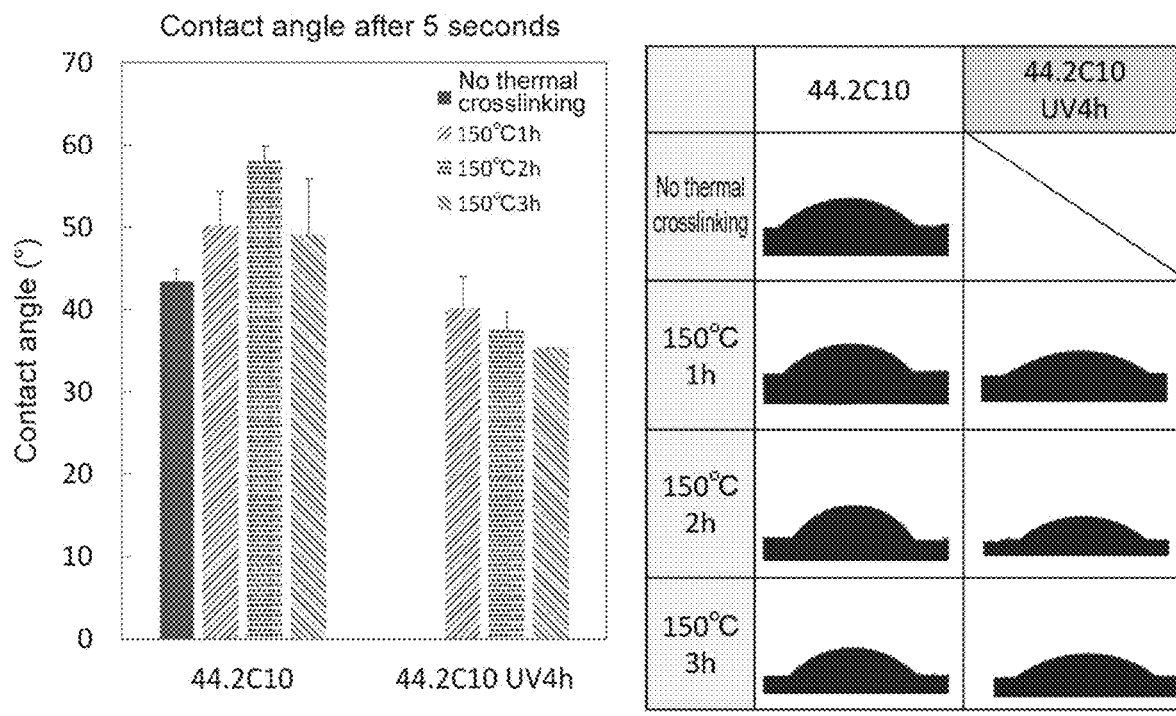
FIG. 14 shows the results of measuring the contact angles of water droplets with powders, where the powders were prepared from 44.2010 ApGltn by Method A-2, Method A-3, or Method A-4, or by subjecting the prepared powders to a surface treatment by UV irradiation. A graph on the left shows a contact angle under each condition. A diagram on the right shows the shape of water droplet observed in each test.

Of each of the powders of Example 9 (UV4), Example 10 (UV4), Example 11 (UV4), and Example 9 (UV0), Example 10 (UV0) and Example 11 (UV0), a contact angle with water was measured by the droplet method. The method is performed as described in [Measurement of Contact Angle with Water (1)]. FIG. 14 shows, for each powder, the images of water droplets and the water contact angles at 5 seconds after dropping. As shown in FIG. 14, the powders of Example 9 (UV4), Example 10 (UV4) and Example 11 (UV4), which were subjected to a surface treatment by UV irradiation, had smaller water contact angles and increased wettability of the particle surface compared to the powders of Example 9

(UV0), Example 10 (UV0) and Example 11 (UV0), which were not subjected to the surface treatment.

[Evaluation of Blood Coagulation Ability]

Blood coagulation ability was evaluated for each powder of Example 9 (UV4), Example 10 (UV4), Example 11 (UV4), Example 9 (UV0), Example 10 (UV0), and Example 11 (UV0).

500 μl of pig blood supplemented with Na citrate was added dropwise onto a stage of a rheometer (brand name: MCR30, manufactured by ANTON PAAR GMBH) pre-warmed to 37 degrees. 50 mg of each powder (10 w/v % particle concentration) was added to the blood and mixed with a spatula. After 2 minutes and 30 minutes, measurements with the rheometer were started under conditions of 1 hertz and 1% strain, and storage modulus (G') was measured for 5 minutes.

Figure 15:
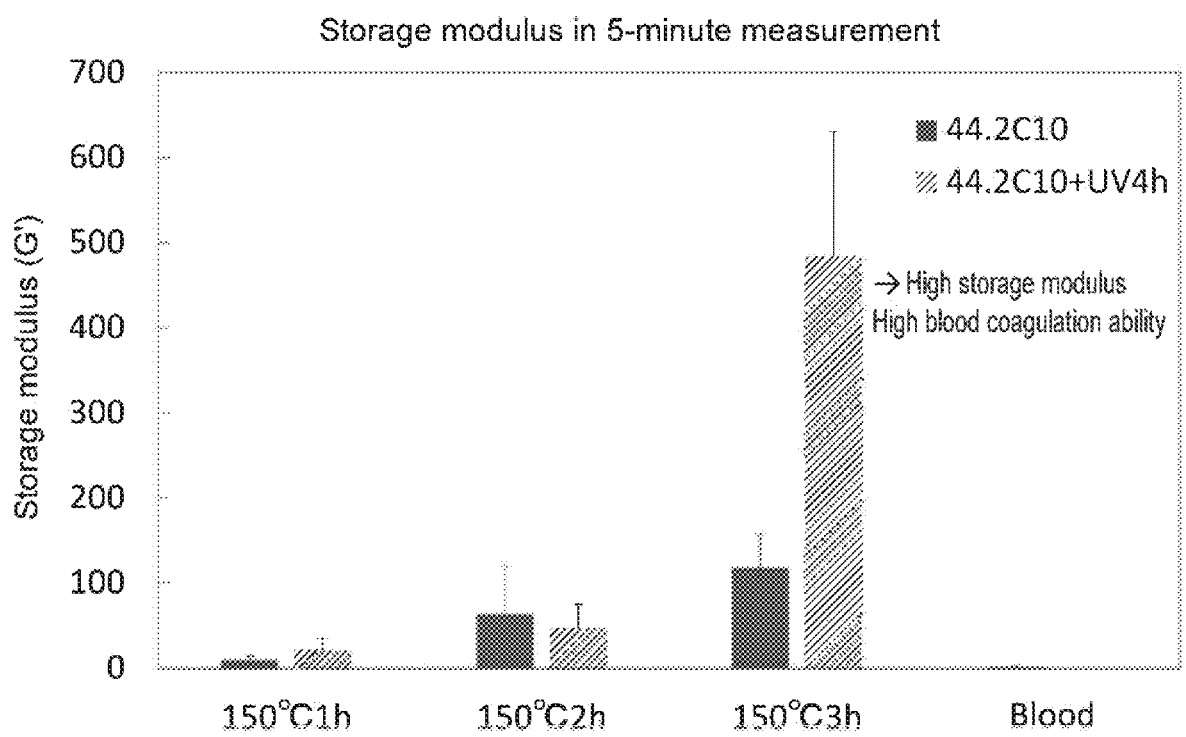
FIG. 15 shows the results of measuring the storage modulus (G') of powders when mixed with pig blood supplemented with an anticoagulant, wherein the powders were prepared from 44.2010 ApGltn by Method A-2, Method A-3, or Method A-4, or further subjecting the prepared powders to a surface treatment by UV irradiation.

The test results are shown in FIG. 15. In all the crosslinked gelatin derivatives subjected or not subjected to a surface treatment by UV irradiation, the storage modulus (G') became larger as the thermal crosslinking time was longer. In particular, the storage modulus (G') was significantly increased when the thermal crosslinking time was 3 hours in the crosslinked gelatin derivatives subjected to a surface treatment by UV irradiation.

The invention claimed is:

1. A powder comprises particles comprising a crosslinked gelatin derivative, wherein the gelatin derivative has a structure represented by formula (1):

$$\text{GltnNH-L-CHR}^1\text{R}^2 \quad (1)$$

wherein Gltn represents a gelatin residue; L represents a single bond or a divalent linking group; $R^1$ represents a hydrocarbon group having 1 to 20 carbon atoms; and $R^2$ represents a hydrogen atom or a hydrocarbon group having 1 to 20 carbon atoms, and wherein the particles have an average sphericity of 1.20 or less, and a standard deviation of sphericity of 0.20 or less.

2. The powder according to claim 1, wherein the gelatin derivative has a structure represented by formula (2):

$$\text{GltnNH-CHR}^1\text{R}^2 \quad (2)$$

wherein Gltn represents a gelatin residue; $R^1$ is an alkyl group having 1 to 17 carbon atoms; and $R^2$ is a hydrogen atom or an alkyl group having 1 to 17 carbon atoms.

3. The powder according to claim 1, wherein
the powder has a water contact angle of less than 70° at 5 seconds after water drops, or
an adhesive strength to porcine inner gastric wall tissue at 5 minutes after immersed in saline is at least two times less than that before the immersion as measured in accordance with ASTM F-2258-05.

4. The powder according to claim 1, wherein the gelatin is an alkali-treated gelatin.

5. The powder according to claim 1, wherein the gelatin is an endotoxin-reduced gelatin.

6. The powder according to claim 1, wherein the gelatin is derived from a cold-water fish.

7. The powder according to claim 1, wherein a cross-sectional area of a gel layer is 0.010 mm² or more by a gel layer cross-sectional area measurement test,
wherein the gel layer cross-sectional area measurement test is conducted by spraying a powder to be measured onto a surface of an esophageal submucosal tissue at an amount of 100 mg per 2.5 cm×2.5 cm; keeping the tissue at 37° C. for 48 hours to form a gel on the surface of the tissue; fixing the gel with neutral buffered formalin to obtain a fixed gel; and observing the fixed gel with a phase contrast microscope and calculating a cross-sectional area of the gel in square millimeters from a phase contrast microscope image, wherein the test is performed three times, and an arithmetic mean of the three calculated values is taken as a cross-sectional area of the gel layer.

8. The powder according to claim 2, wherein the powder has a storage modulus (G') of 200 or more as measured 2 minutes and 30 minutes after the powder is mixed with pig blood supplemented with an anticoagulant.

9. A wound dressing material comprising the powder according to claim 1.

10. An anti-adhesion material comprising the powder according to claim 1.

11. A topical hemostatic material comprising the powder according to claim 8.

12. A method for producing the powder of claim 1, comprising:
dissolving the gelatin derivative in a first solvent to obtain a gelatin solution containing the gelatin derivative and the first solvent;
adding a second solvent to the gelatin solution to deposit intermediate particles containing the gelatin derivative in the gelatin solution;
lyophilizing the gelatin solution after the deposition to obtain an intermediate powder containing the intermediate particles; and
crosslinking the gelatin derivative in the intermediate particles to obtain the powder.

13. The method according to claim 12, wherein the gelatin derivative has a structure represented by formula (2):

$$\text{GltnNH-CHR}^1\text{R}^2 \quad (2)$$

wherein Gltn represents a gelatin residue; $R^1$ is an alkyl group having 1 to 17 carbon atoms; and $R^2$ is a hydrogen atom or an alkyl group having 1 to 17 carbon atoms.

14. The method according to claim 12, wherein the gelatin derivative is crosslinked by heating the intermediate powder.

15. The method according to claim 14, wherein the gelatin derivative is crosslinked by heating the intermediate powder at 100 to 200° C. for 2.5 to 5 hours.

16. The method according to claim 12, further comprising irradiating the powder comprising the particles containing the crosslinked gelatin derivative with ultraviolet light to hydrophilize surfaces of the particles.

17. The method according to claim 16, wherein the powder is irradiated with ultraviolet light for 3 to 6 hours.

* * * * *